(12) United States Patent  
Shashua et al.

(10) Patent No.: US 11,216,675 B2  
(45) Date of Patent: Jan. 4, 2022

(54) SYSTEMS AND METHODS FOR DETECTING AN OBJECT

(71) Applicant: Mobileye Vision Technologies Ltd., Jerusalem (IL)

(72) Inventors: Amnon Shashua, Jerusalem (IL); Erez Dagan, Tel Aviv (IL); Tomer Baba, Jerusalem (IL); Yoni Myers, Jerusalem (IL); Yossi Hollander, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 0 days.

(21) Appl. No.: 17/082,363

(22) Filed: Oct. 28, 2020

(65) Prior Publication Data

US 2021/0042539 A1 Feb. 11, 2021

Related U.S. Application Data

(63) Continuation of application No. 16/793,719, filed on Feb. 18, 2020, now Pat. No. 10,832,063, which is a (Continued)

(51) Int. Cl.  
*G06K 9/00* (2006.01)  
*G06T 7/00* (2017.01)  
(Continued)

(52) U.S. Cl.  
CPC .......... *G06K 9/00805* (2013.01); *B60K 37/02* (2013.01); *B60R 1/00* (2013.01); (Continued)

(58) Field of Classification Search  
CPC ...... G06K 9/00805; G06T 7/215; B60R 11/04 (Continued)

(56) References Cited

U.S. PATENT DOCUMENTS 10,572,744 B2 2/2020 Shashua  
2006/0013480 A1 1/2006 Sano  
(Continued)

FOREIGN PATENT DOCUMENTS

CN 101395645 A 3/2009  
CN 102270344 A 12/2011  
(Continued)

OTHER PUBLICATIONS

International Search Report and Written Opinion dated Feb. 2, 2016 and received in corresponding International application No. PCT/IB2015/001593 (22 pages).

(Continued)

*Primary Examiner* — Jeffery A Williams  
(74) *Attorney, Agent, or Firm* — Finnegan, Henderson, Farabow, Garrett & Dunner, LLP

(57) ABSTRACT

Systems and methods are provided for detecting an object in front of a vehicle. In one implementation, an object detecting system includes an image capture device configured to acquire a plurality of images of an area, a data interface, and a processing device programmed to compare a first image to a second image to determine displacement vectors between pixels, to search for a region of coherent expansion that is a set of pixels in at least one of the first image and the second image, for which there exists a common focus of expansion and a common scale magnitude such that the set of pixels satisfy a relationship between pixel positions, displacement vectors, the common focus of expansion, and the common scale magnitude, and to identify presence of a substantially upright object based on the set of pixels.

20 Claims, 32 Drawing Sheets

Related U.S. Application Data continuation of application No. 15/308,292, filed as application No. PCT/IB2015/001593 on Jun. 3, 2015, now Pat. No. 10,572,744.

(60) Provisional application No. 62/006,912, filed on Jun. 3, 2014.

(51) Int. Cl.
| | | |
|---|---|---|
| *B60R 11/00* | (2006.01) | |
| *G06T 7/215* | (2017.01) | |
| *B60K 37/02* | (2006.01) | |
| *B60R 1/00* | (2006.01) | |
| *B60R 11/04* | (2006.01) | |

(52) U.S. Cl.
CPC ............. *B60R 11/04* (2013.01); *G06T 7/215* (2017.01); *B60K 2370/148* (2019.05); *B60K 2370/1438* (2019.05); *B60K 2370/1446* (2019.05); *B60K 2370/21* (2019.05); *B60R 2300/105* (2013.01); *B60R 2300/202* (2013.01); *B60R 2300/303* (2013.01); *B60R 2300/804* (2013.01); *B60R 2300/8026* (2013.01); *B60R 2300/8033* (2013.01); *B60R 2300/8066* (2013.01); *B60R 2300/8093* (2013.01); *B60Y 2400/92* (2013.01); *G06T 2207/10021* (2013.01); *G06T 2207/30261* (2013.01)

(58) Field of Classification Search
USPC ........................................................ 348/148
See application file for complete search history.

(56) References Cited

U.S. PATENT DOCUMENTS

| | | |
|---|---|---|
| 2006/0178830 A1 | 8/2006 | Sherony |
| 2009/0252377 A1 | 10/2009 | Akita et al. |
| 2010/0305857 A1* | 12/2010 | Byrne .................. G06T 7/73 701/301 |
| 2015/0234045 A1 | 8/2015 | Rosenblum et al. |

FOREIGN PATENT DOCUMENTS

| | | |
|---|---|---|
| CN | 102754138 A | 10/2012 |
| CN | 102792314 A | 11/2012 |
| CN | 103578115 A | 2/2014 |
| CN | 103661374 A | 3/2014 |
| EP | 1617378 A2 | 1/2006 |

OTHER PUBLICATIONS

Lawton et al., "Processing Translational Motion Sequences," Computer Vision, Graphics, and Image Processing, vol. 22. No. 1, Apr. 1, 1983, pp. 116-144 (29 pages).

Thompson et al., "Chapter 11: Motion of Viewer and Objects," in "Visual Perception From a Computer Graphics Perspective," Jan. 1, 2011, CRC Press, pp. 445-484 (44 pages).

Sundareswaran et al., "Chapter 12: Fast Processing of Image Motion Patterns Arising from 3-D Translational Motion," in "Optic Flow and Beyond," Jan. 1, 2004, Springer Science and Business Media B.V., pp. 273-287 (15 pages).

Byrne, et al., "Expansion Segmentation for Visual Collision Detection and Estimation," 2009 IEEE International Conference on Robotics and Automation, Kobe, Japan, May 12-17, 2009, pp. 875-882 (8 pages).

Ni et al., "Detection of Collision Events on Curved Trajectories: Optical Information From Invariant Rate-of-Bearing Change," Perception and Psychophysics, vol. 70, No. 7, Oct. 1, 2008, pp. 1314-1324 (11 pages).

First Office Action issued by the Chinese Patent Office dated Oct. 8, 2019 and an English translation thereof.

Office Action issued by the Chinese Patent Office in Application No. 2020112001566, dated Jul. 22, 2021 and an English translation thereof (15 pages).

* cited by examiner

SYSTEMS AND METHODS FOR DETECTING AN OBJECT

CROSS-REFERENCES TO RELATED APPLICATIONS

This application is a continuation of U.S. patent application Ser. No. 16/793,719 filed Feb. 18, 2020, which is a is a continuation of U.S. patent application Ser. No. 15/308,292 filed Nov. 1, 2016, now U.S. Pat. No. 10,572,744, which is a national stage entry of PCT International Application No. PCT/IB2015/001593, filed Jun. 3, 2015, which claims the benefit of priority of U.S. Provisional Patent Application No. 62/006,912, filed on Jun. 3, 2014. The foregoing applications are incorporated herein by reference in their entirety.

BACKGROUND

I. Technical Field

The present disclosure relates generally to autonomous vehicle navigation and, more specifically, to systems and methods that use cameras to detect an object in front of the vehicle.

II. Background Information

As technology continues to advance, the goal of a fully autonomous vehicle that is capable of navigating on roadways is on the horizon. Primarily, an autonomous vehicle may be able to identify its environment and navigate without input from a human operator. Autonomous vehicles may also take into account a variety of factors and make appropriate decisions based on those factors to safely and accurately reach an intended destination. For example, various objects—such as other vehicles and pedestrians—are encountered when a vehicle typically travels a roadway. Autonomous driving systems may recognize these objects in a vehicle's environment and take appropriate and timely action to avoid collisions. Additionally, autonomous driving systems may identify other indicators—such as traffic signals, traffic signs, and lane markings—that regulate vehicle movement (e.g., when the vehicle must stop and may go, a speed at which the vehicle must not exceed, where the vehicle must be positioned on the roadway, etc.). Autonomous driving systems may need to determine when a vehicle should change lanes, turn at intersections, change roadways, etc. As is evident from these examples, many factors may need to be addressed in order to provide an autonomous vehicle that is capable of navigating safely and accurately.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle and cause a navigational response based on an analysis of images captured by one or more of the cameras.

Consistent with a disclosed embodiment, an object detecting system for a vehicle is provided. The system may include at least one image capture device configured to acquire a plurality of images of an area in front of the vehicle. The system may include a data interface, and at least one processing device programmed to receive the plurality of images via the data interface. The at least one processing device may also be programmed to compare a first image to a second image to determine displacement vectors between pixels of the first image and pixels of the second image. The at least one processing device may further be programmed to search for a region of coherent expansion that is a set of pixels in at least one of the first image and the second image, for which there exists a common focus of expansion and a common scale magnitude such that the set of pixels satisfy a relationship between pixel positions, displacement vectors, the common focus of expansion, and the common scale magnitude. The at least one processing device may further be programmed to identify presence of a substantially upright object in at least one of the first image and the second image based on the set of pixels.

Consistent with another disclosed embodiment, a vehicle is provided. The vehicle may include a body. The vehicle may include at least one image capture device configured to acquire a plurality of images of an area in front of the vehicle. The system may include a data interface and at least one processing device programmed to receive the plurality of images via the data interface. The at least one processing device may also be programmed to compare a first image to a second image to determine displacement vectors between pixels of the first image and pixels of the second image. The at least one processing device may further be programmed to search for a region of coherent expansion that is a set of pixels in at least one of the first image and the second image, for which there exists a common focus of expansion and a common scale magnitude such that the set of pixels satisfy a relationship between pixel positions, displacement vectors, the common focus of expansion, and the common scale magnitude. The at least one processing device may further be programmed to identify presence of a substantially upright object in at least one of the first image and the second image based on the set of pixels.

Consistent with yet another disclosed embodiment, a method for detecting an object in front of a vehicle is provided. The method may include acquiring, via at least one image capture device, a plurality of images of an area in front of the vehicle. The method may also include receiving, via a processing device, the plurality of images. The method may also include comparing, via the processing device, a first image to a second image to determine displacement vectors between pixels of the first image and pixels of the second image. The method may further include searching for, via the processing device, a region of coherent expansion that is a set of pixels in at least one of the first image and the second image, for which there exists a common focus of expansion and a common scale magnitude such that the set of pixels satisfy a relationship between pixel positions, displacement vectors, the common focus of expansion, and the common scale magnitude. The method may further include identifying, via the processing device, presence of a substantially upright object in at least one of the first image and the second image based on the set of pixels.

Consistent with another disclosed embodiment, an object detecting system for a vehicle is provided. The object detecting system may include at least one image capture device configured to acquire a plurality of images of an area in front of the vehicle. The system may also include a data interface and at least one processing device programmed to receive the plurality of images via the data interface. The at least one processing device may also be programmed to compare a first image to a second image, and based on the comparison, determine a focus of expansion of a crossing object moving in a direction that crosses a travel direction of the vehicle. The at least one processing device may also be programmed to determine whether a horizontal coordinate of the focus of expansion stays around a center in the horizontal dimension of the crossing object during a period of time. The at least one processing device may further be programmed to cause the vehicle to brake based on the determination that the horizontal coordinate of the focus of expansion stays around the center in the horizontal dimension of the crossing object during the period of time.

Consistent with another disclosed embodiment, a vehicle is provided. The vehicle may include a body, and at least one image capture device configured to acquire a plurality of images of an area in front of the vehicle. The system may also include a data interface and at least one processing device programmed to receive the plurality of images via the data interface. The at least one processing device may also be programmed to compare a first image to a second image, and based on the comparison, determine a focus of expansion of a crossing object moving in a direction that crosses a travel direction of the vehicle. The at least one processing device may also be programmed to determine whether a horizontal coordinate of the focus of expansion stays around a center in the horizontal dimension of the crossing object during a period of time. The at least one processing device may further be programmed to cause the vehicle to brake based on the determination that the horizontal coordinate of the focus of expansion stays around the center in the horizontal dimension of the crossing object during the period of time.

Consistent with another disclosed embodiment, a method for detecting an object in front of a vehicle is provided. The method may include acquiring, via at least one image capture device, a plurality of images of an area in front of the vehicle. The method may include receiving, via a processing device, the plurality of images. The method may also include comparing, via the processing device, a first image to a second image, and based on the comparison, determining a focus of expansion of a crossing object moving in a direction that crosses a travel direction of the vehicle. The method may also include determining, via the processing device, whether a horizontal coordinate of the focus of expansion stays around a center in the horizontal dimension of the crossing object during a period of time. The method may also include causing, via the processing device, the vehicle to brake based on the determination that the horizontal coordinate of the focus of expansion stays around a center in the horizontal dimension of the crossing object during the period of time.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute apart of this disclosure, illustrate various disclosed embodiments, in the drawings.

DETAILED DESCRIPTION

Figure 1:
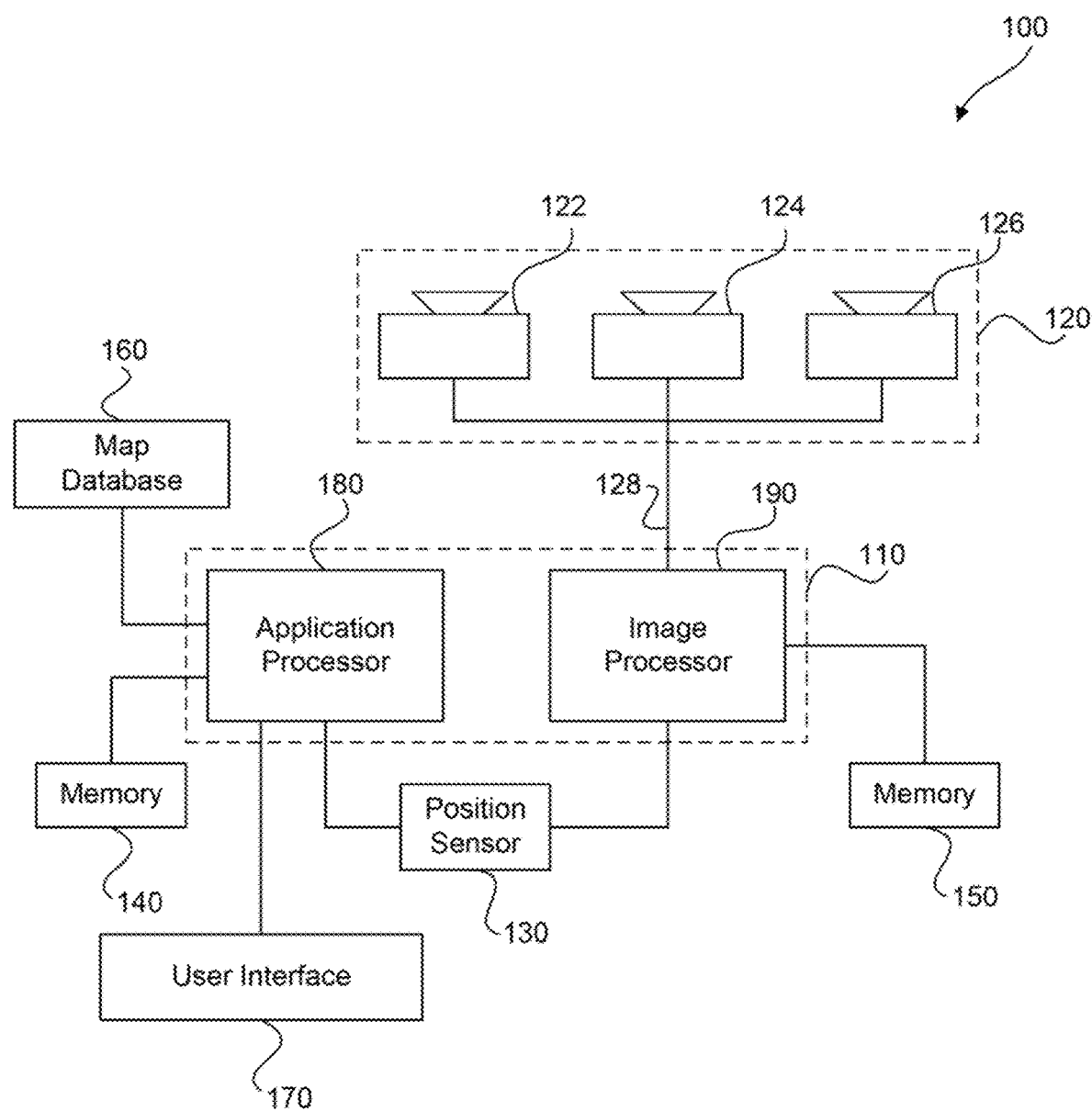
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, and a user interface 170. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Both applications processor 180 and image processor 190 may include various types of processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.).

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
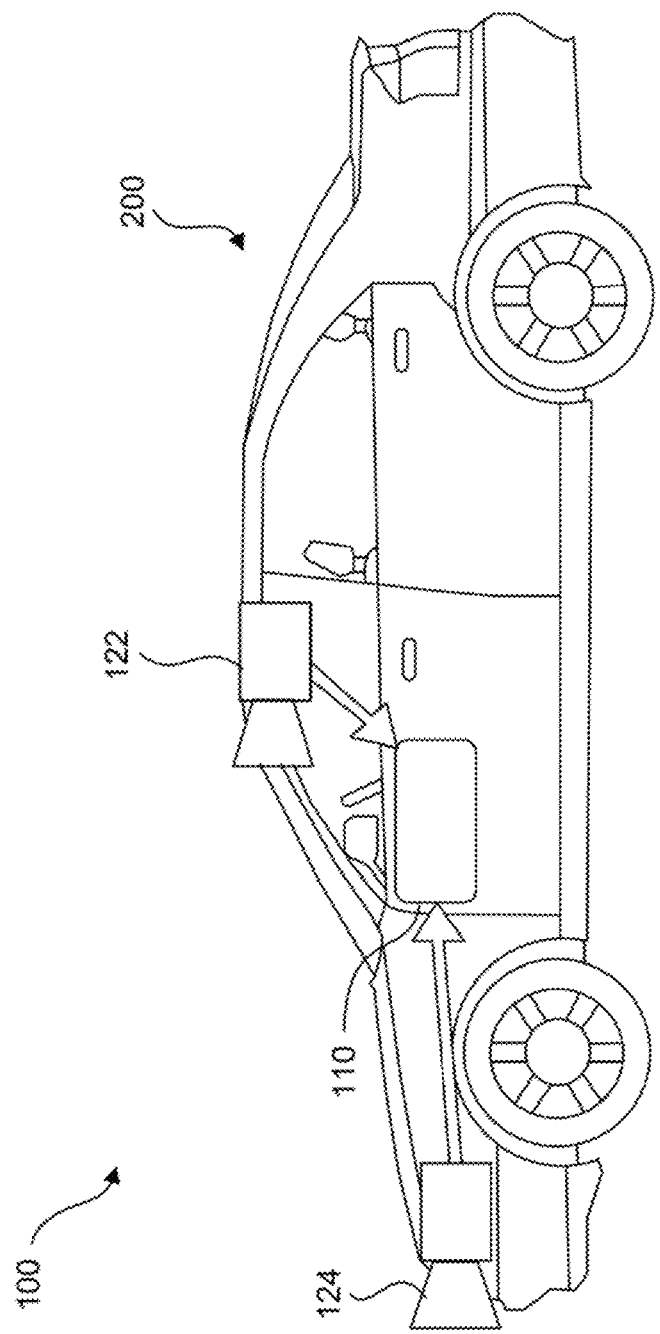
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
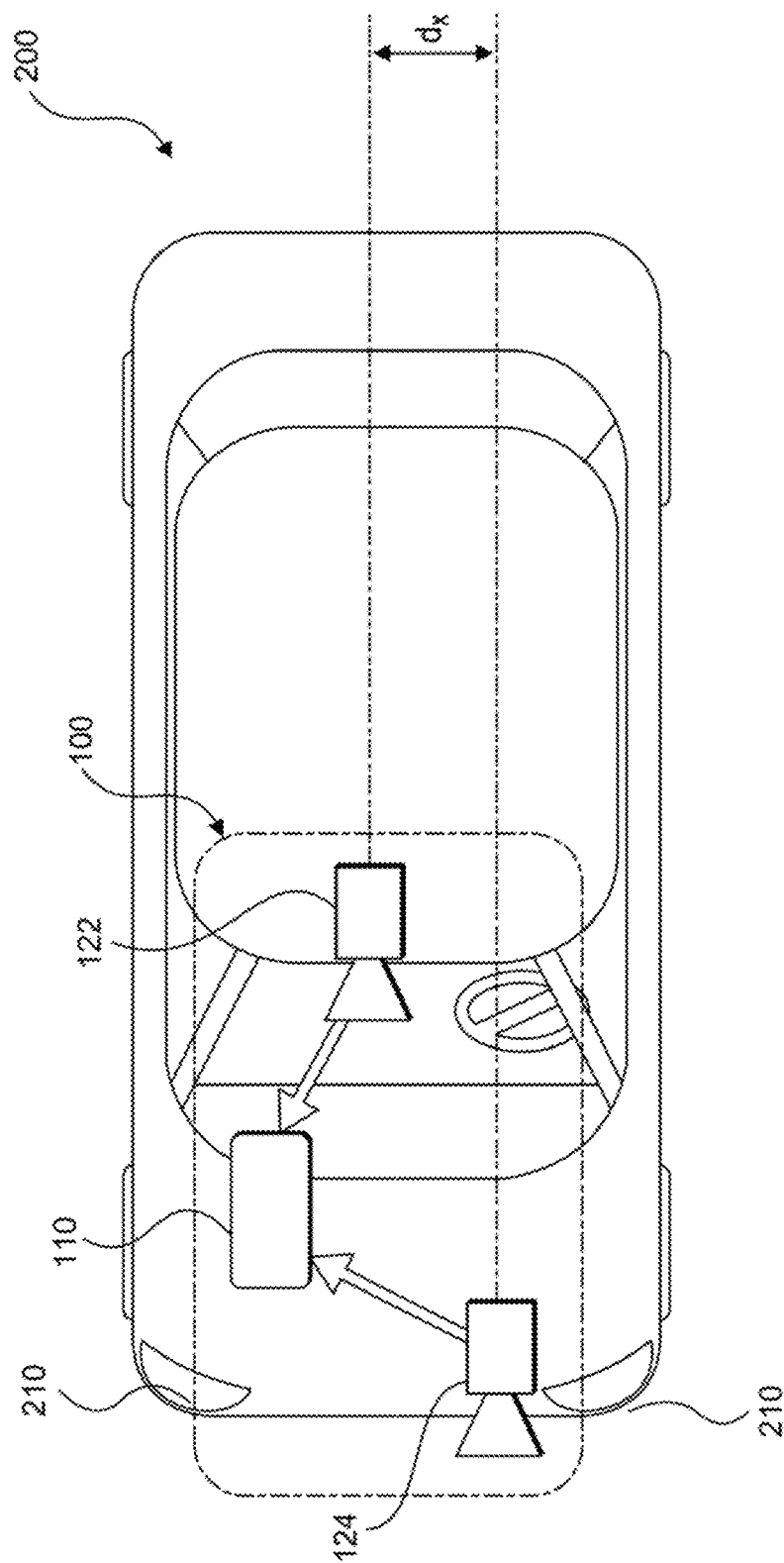
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
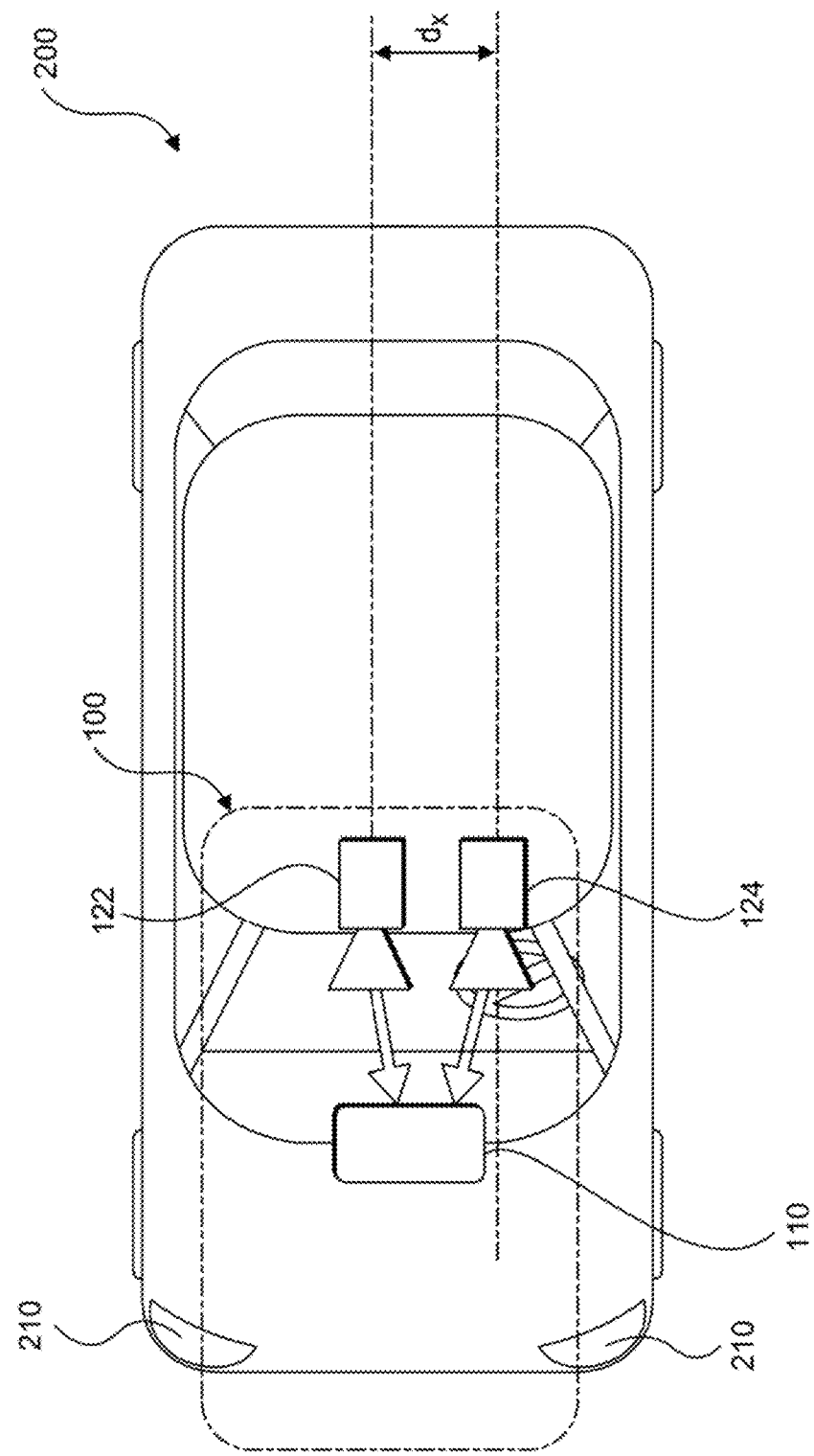
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 20. Additionally, while two image capture devices 122 and 124 are shown in FIGS. 28 and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
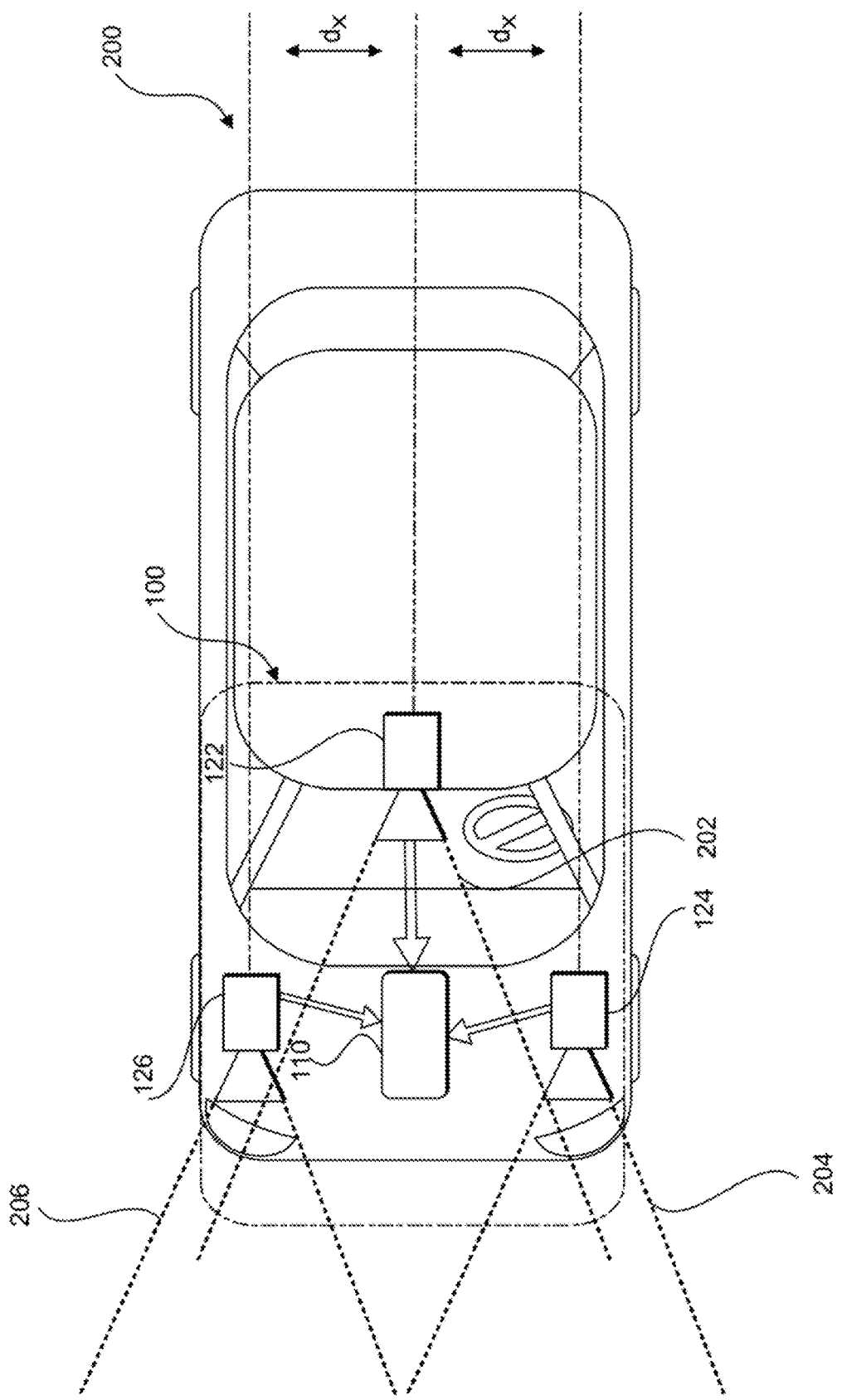
FIG. 2D is a diagrammatic top view representation of yet another embodiment of a vehicle including a system consistent with the disclosed embodiments.
Figure 2E:
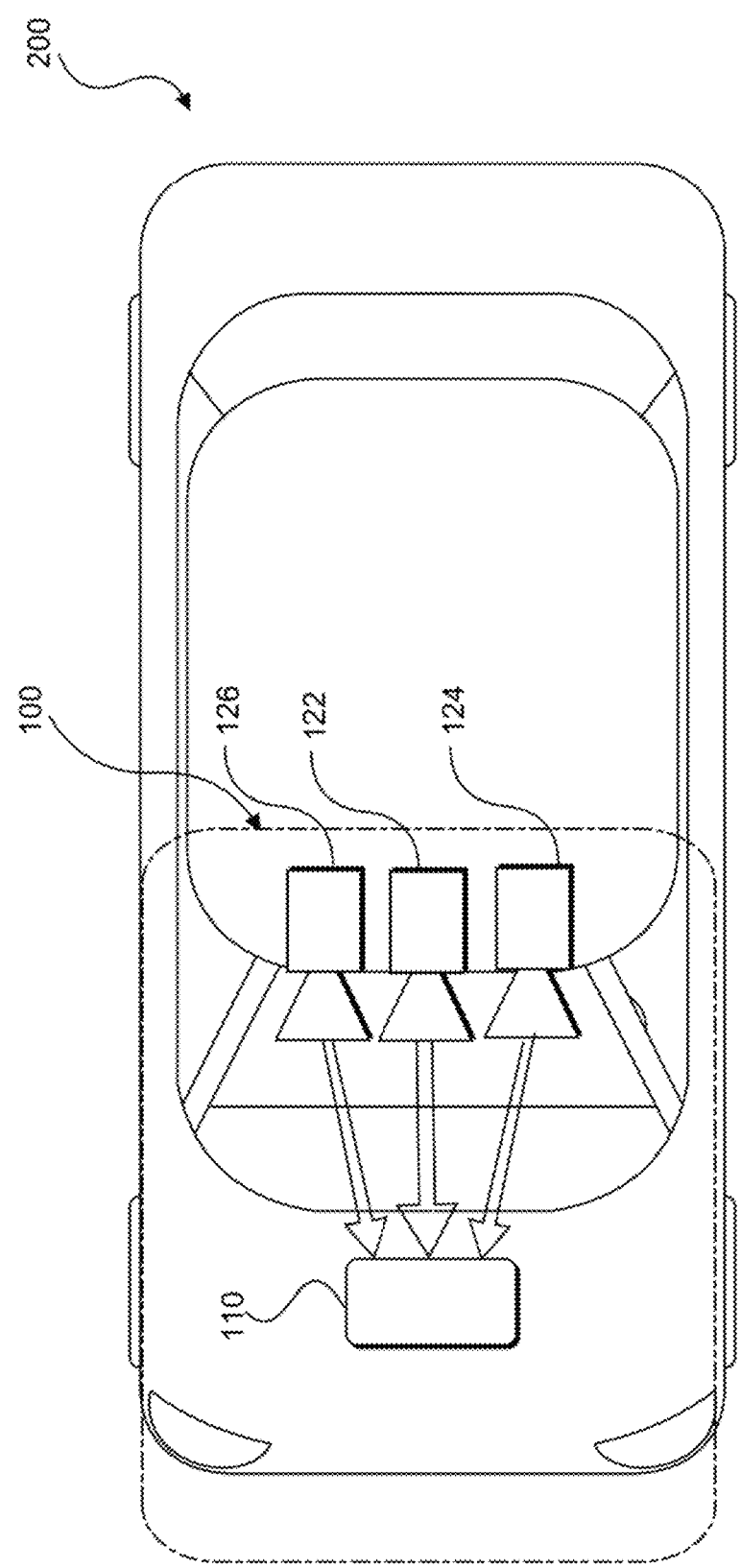
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 20. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126, For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280× 960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line san rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 20, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
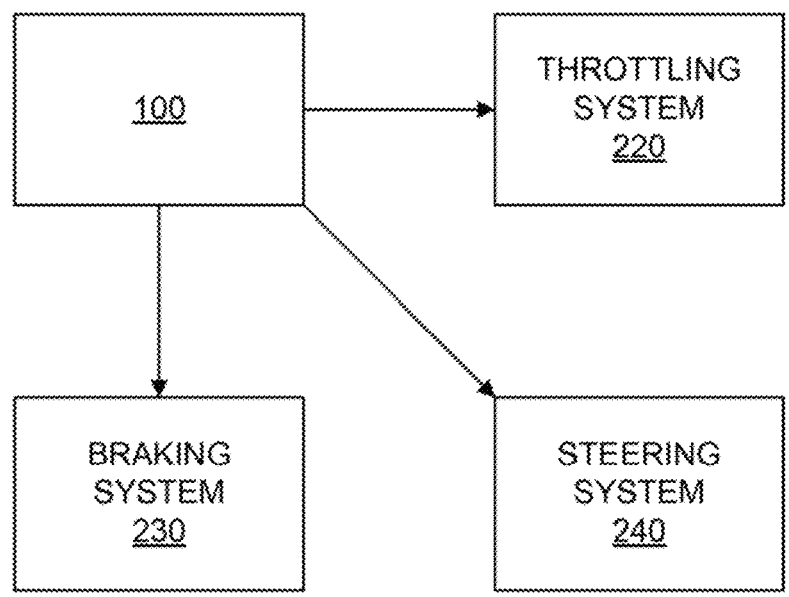
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
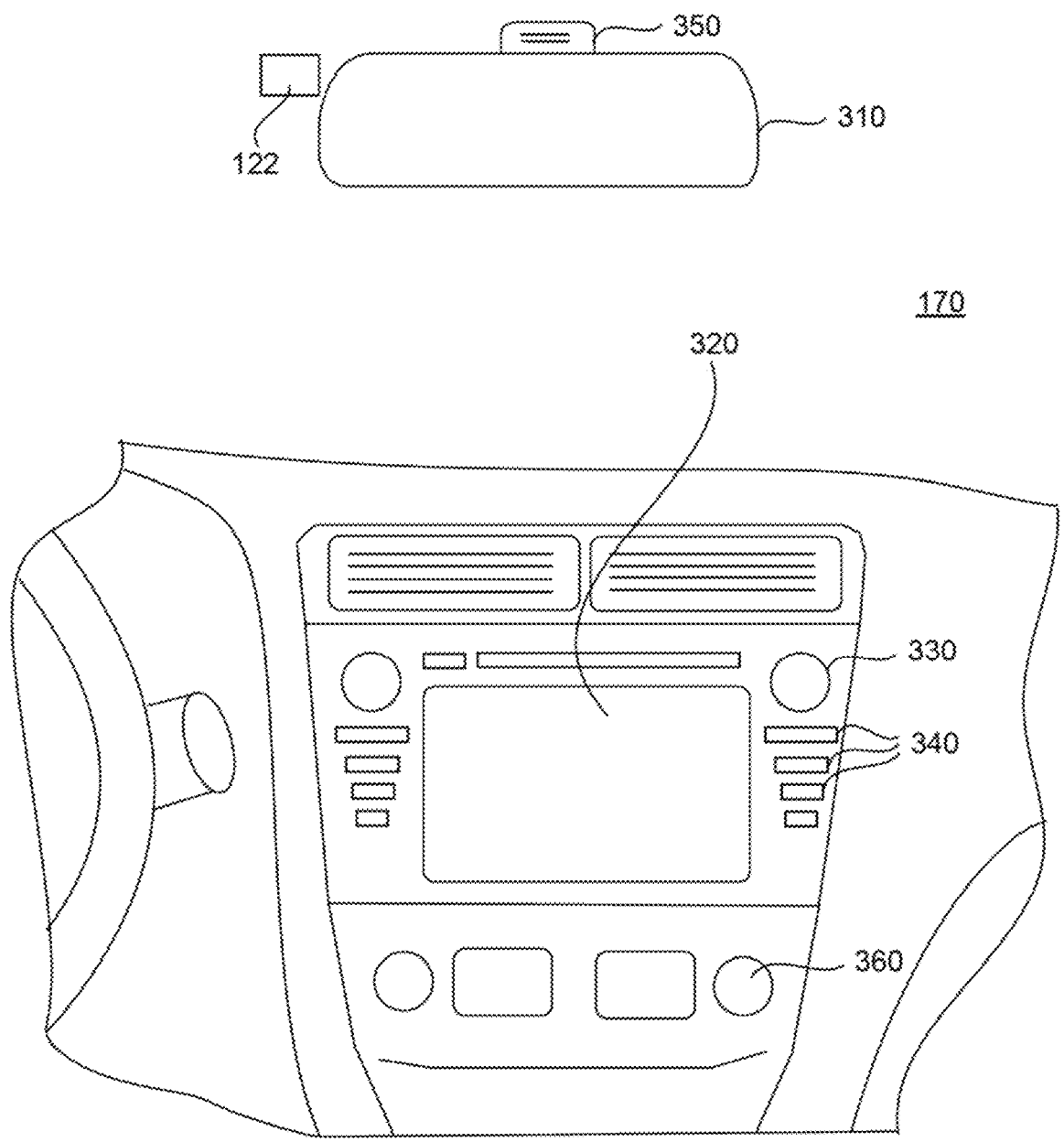
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
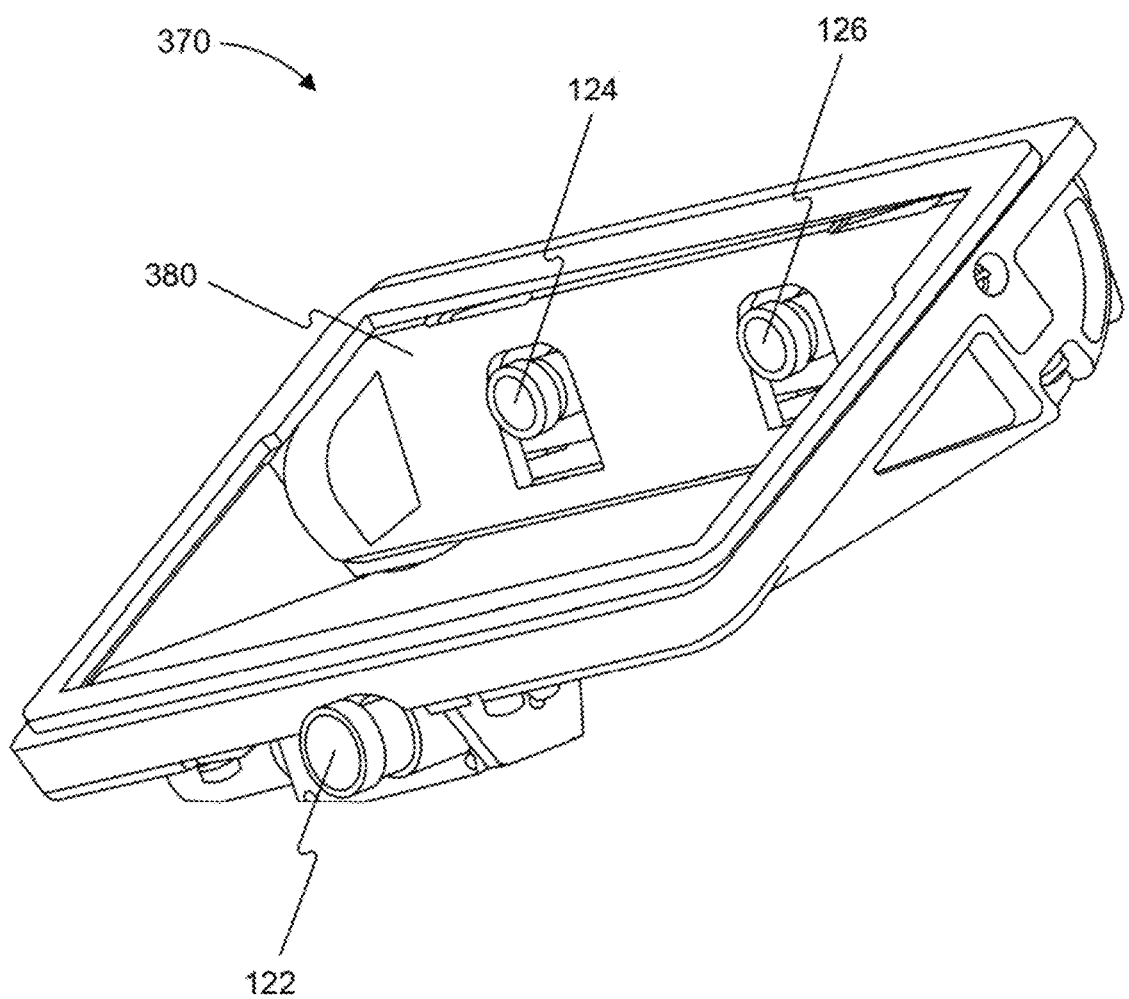
FIG. 3B is an illustration of an example of a camera mount that is configured to be positioned behind a rearview mirror and against a vehicle windshield consistent with the disclosed embodiments.
Figure 3C:
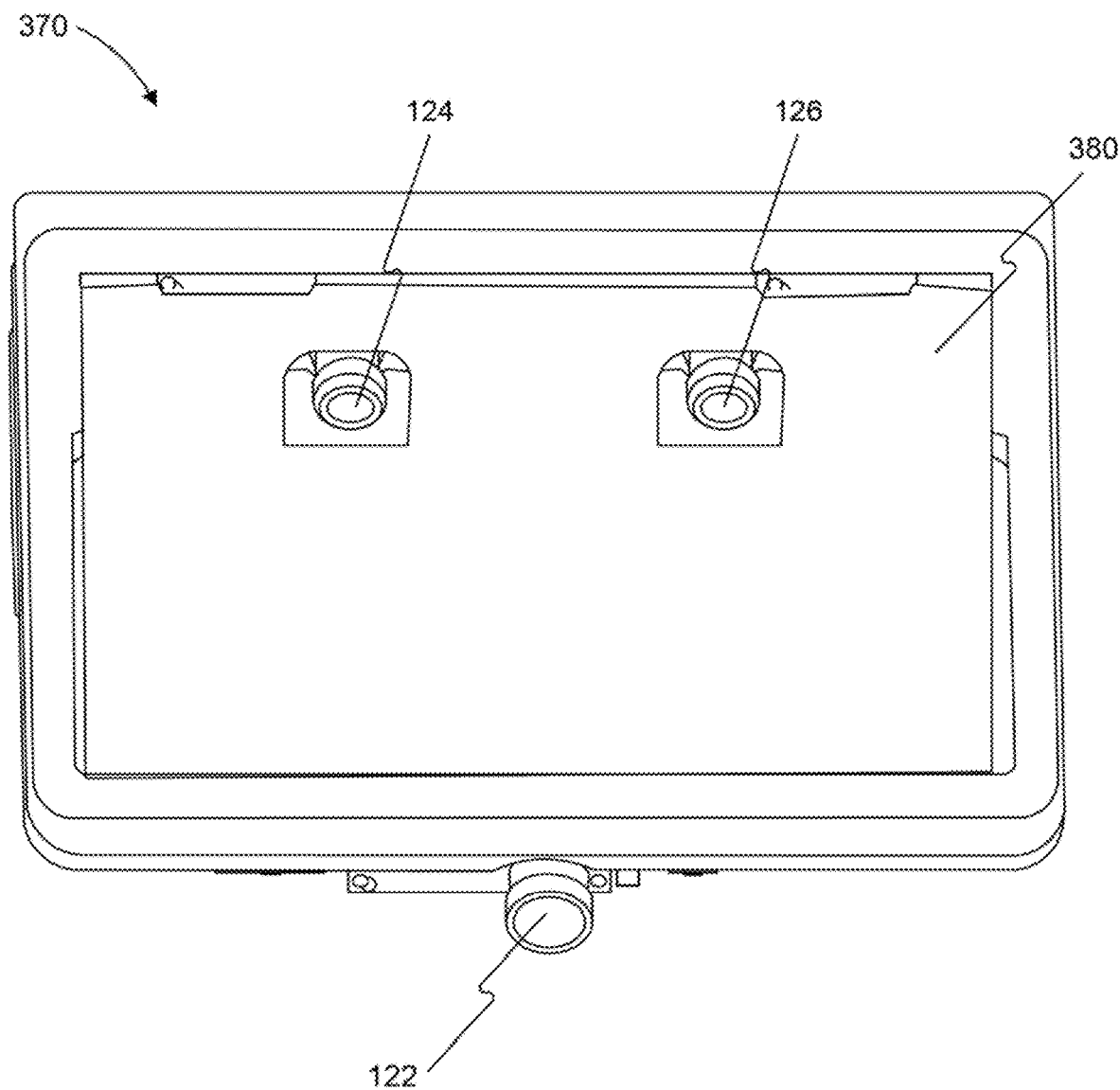
FIG. 3C is an illustration of the camera mount shown in FIG. 3B from a different perspective consistent with the disclosed embodiments.
Figure 3D:
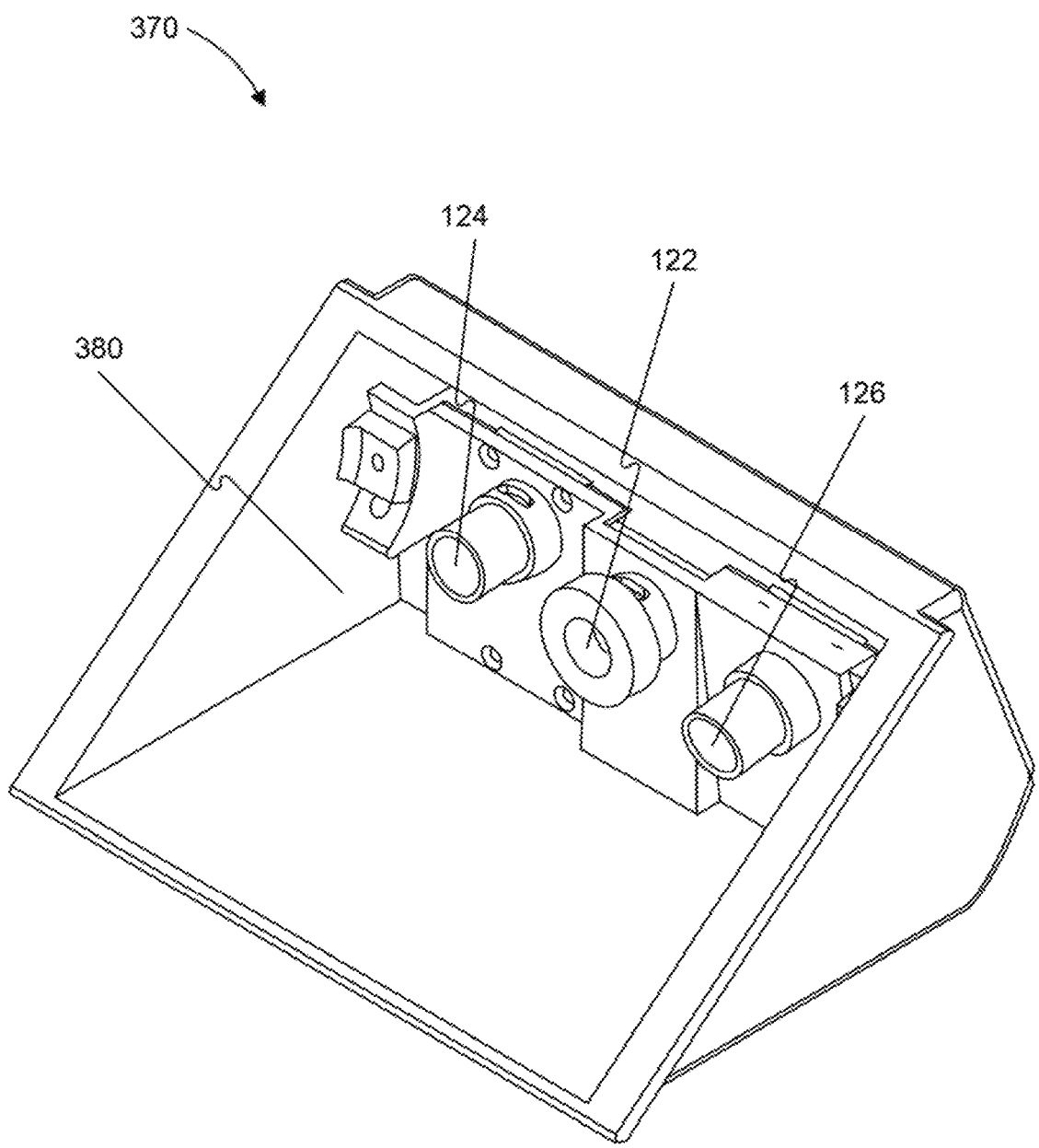
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield

380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
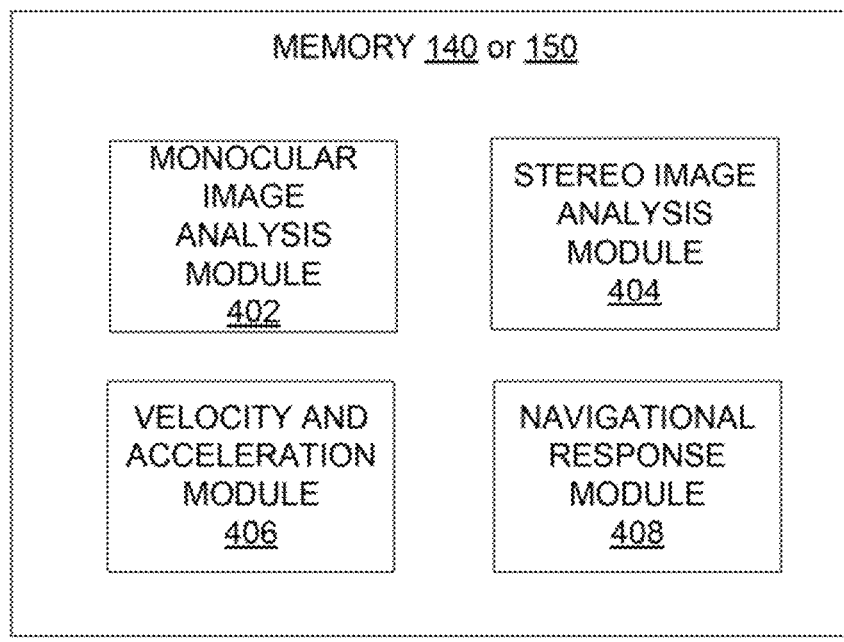
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402-408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Figure 5A:
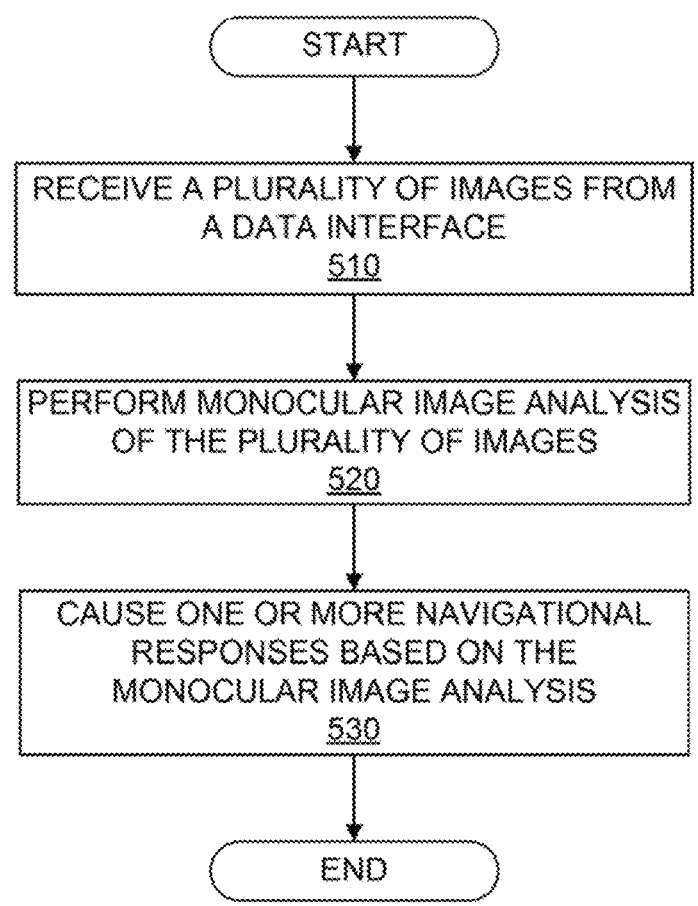
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
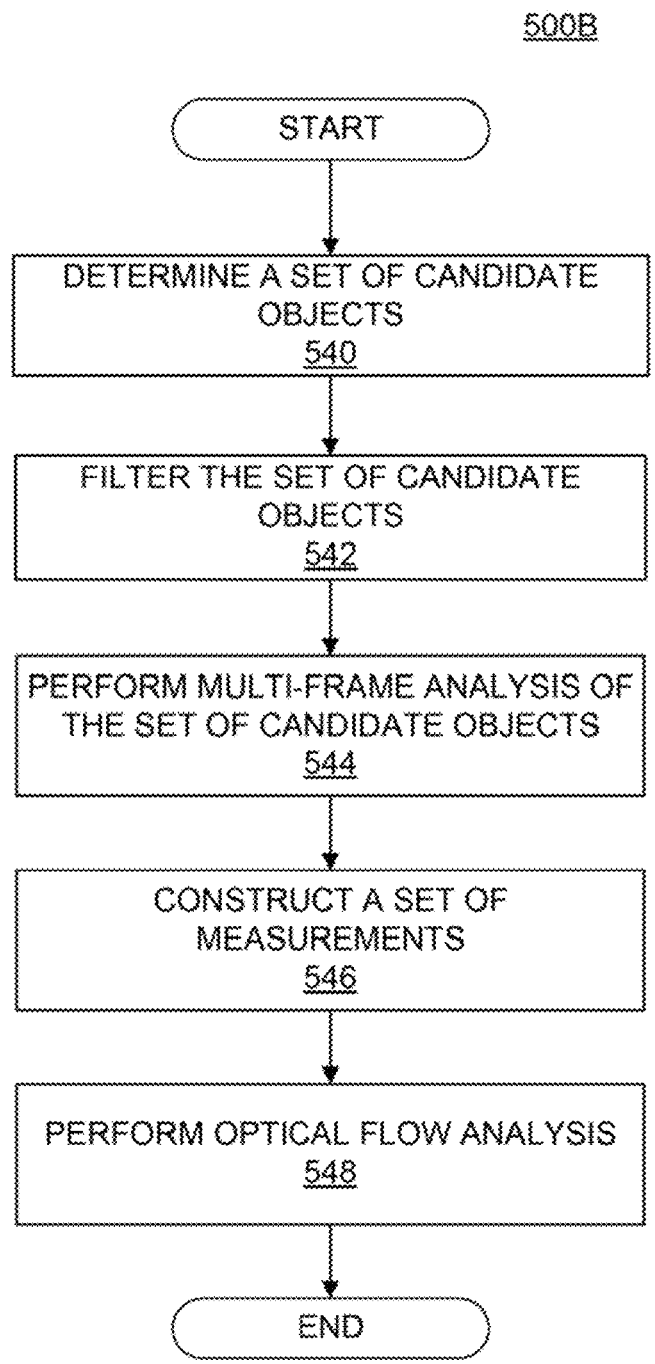
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 20, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that am nearby vehicle 200. Processing unit 110 may perform optical flow analysis in combination with steps 540-546 to provide redundancy for detecting vehicles and pedestrians and increase the reliability of system 100.

Figure 5C:
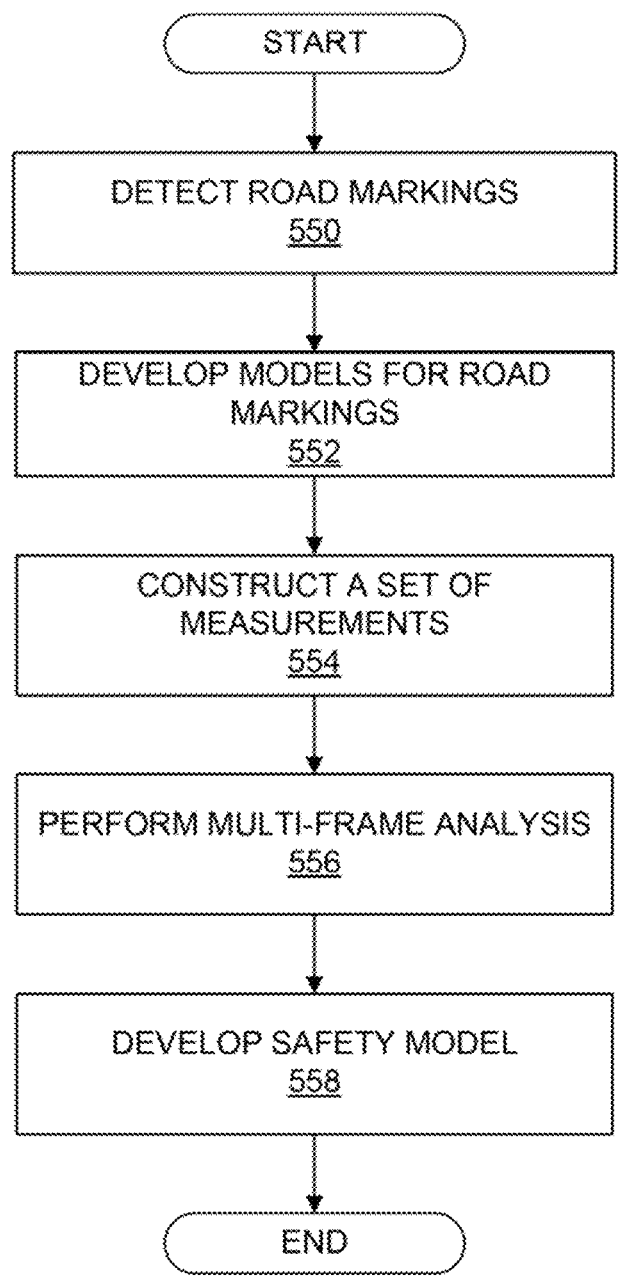
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 10 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200, in addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
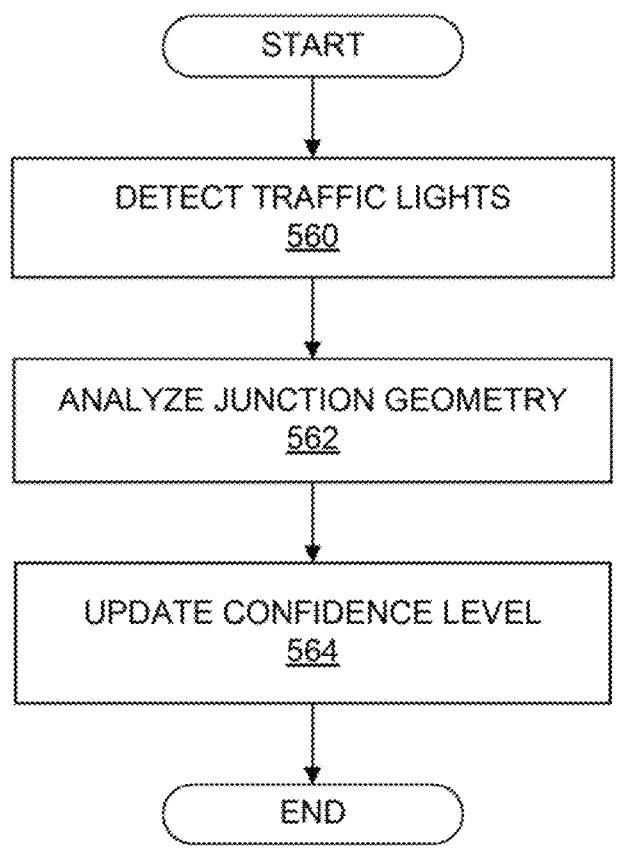
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 10 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
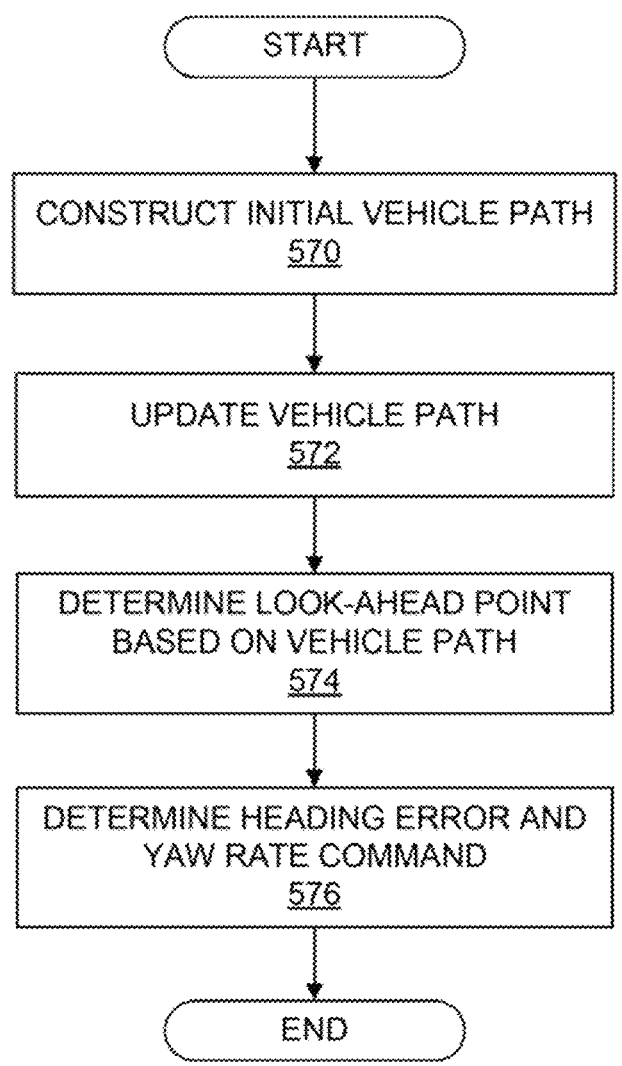
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance d between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_l$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_l, z_l)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_l/z_l)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
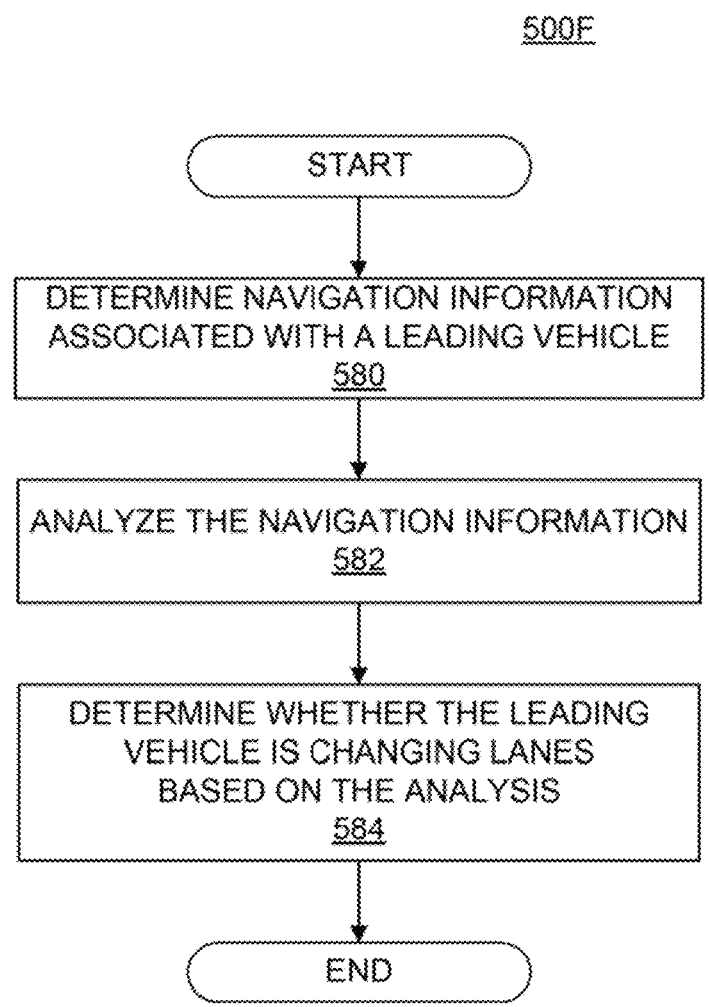
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 10 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2 + \delta_x^2)/$ $2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
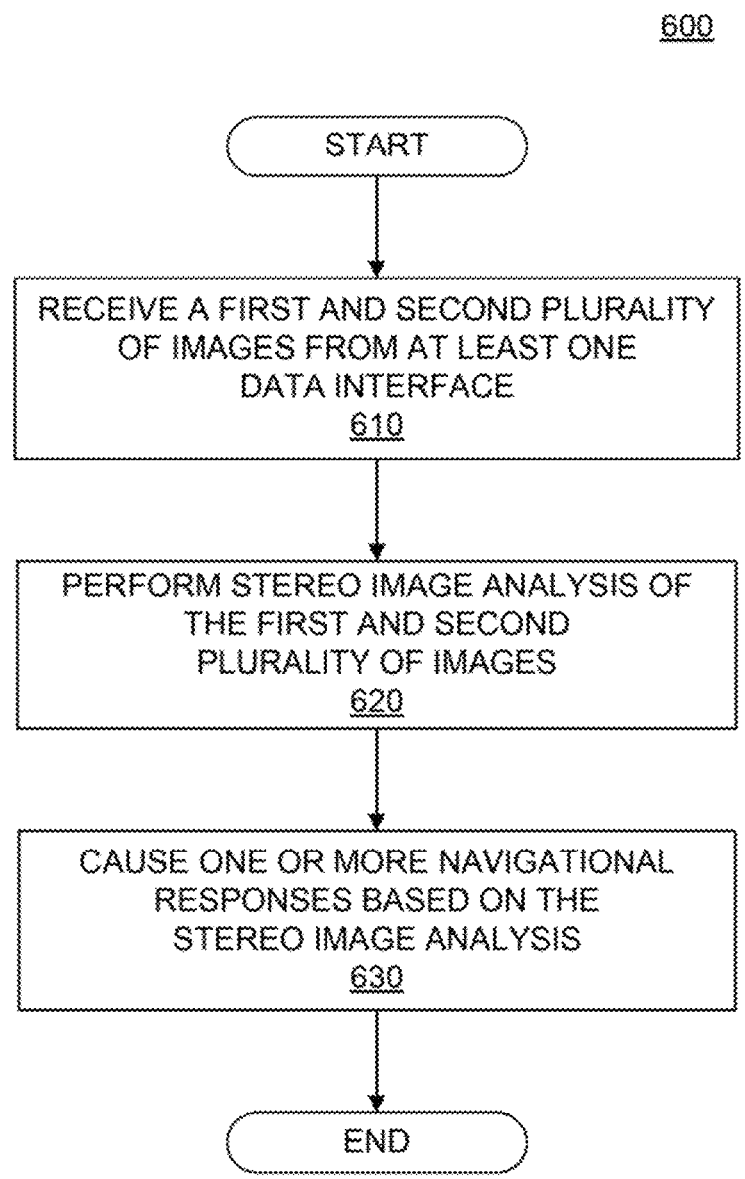
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
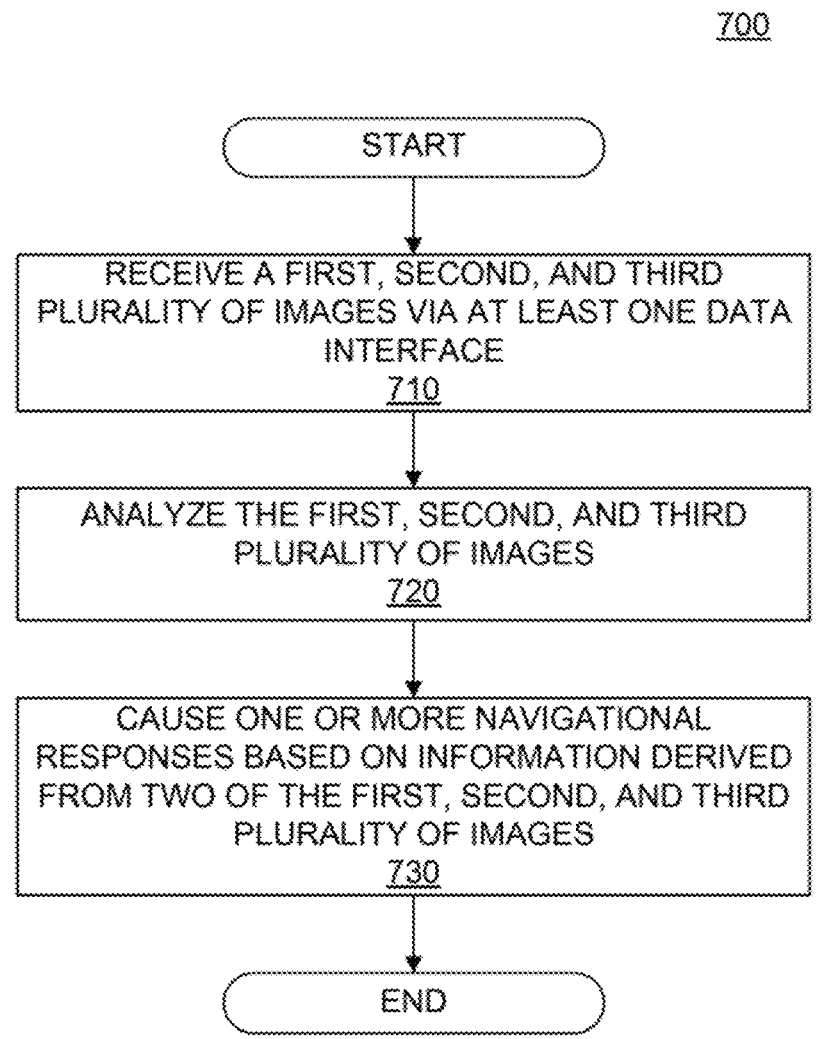
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 20 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126— including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof.

Object Detecting System

In some embodiments, vehicle 200 may include an object detecting system configured to detect an object in front of vehicle 200 and in some circumstances, cause vehicle 200 to brake, e.g., using braking system 230, based on the detection of the object. For example, the object detecting system may cause vehicle 200 to brake automatically, or autonomously, without or with limited driver intervention. The automatic or autonomous object detecting and braking system may or may not allow a driver to intervene to take over control of braking system 230.

The object detecting system may include a plurality of other systems discussed above. For example, the object detecting and braking system may include system 100, braking system 230, and one or more of image capture devices 122, 124, and 126. The one or more of image capture devices 122, 124, and 126 may acquire one or more images of an environment or an area in front of vehicle 200, which may include an object, such as another vehicle, a pedestrian, etc. Processing unit 110 may compare at least two images to obtain optical flow information, which may include a vector field formed by a plurality of vectors (e.g., displacement vectors) each representing a displacement between a first pixel in the first image and a corresponding second pixel in the second image. Based on the optical flow information, processing unit 110 may detect an object, such as an upright object in the images, and may verify the structure of the object. The upright object may have a low (e.g., short) time to collision with vehicle 200. Thus, the upright object may also be referred to as a low time-to-collision upright object. In some embodiments, processing unit may search for a region of coherent expansion that is a set of pixels in, e.g., the first image, for which there exists a common focus of expansion and a common scale magnitude such that the set of pixels satisfy a relationship between pixel positions, displacement vectors, the common focus of expansion, and the common scale magnitude. The region of coherent expansion may represent a low time-to-collision upright object. The scale magnitude may be defined as a magnitude of a displacement vector associated with the pixel (if denoted as d) divided by a distance (if denoted as r) from the pixel to the focus of expansion, i.e., scale magnitude=d/r. The scale magnitude may also be referred to as the expansion rate.

In some embodiments, processing unit 110 may calculate a plurality of combinations of possible scale magnitudes and possible focus of expansions for a plurality of pixels from at least one of the first image and the second image. The plurality of pixels may include the set of pixels to be searched for. In some embodiments, processing unit 110 may determine the common focus of expansion and the common scale magnitude based on a distribution of the plurality of combinations of possible scale magnitudes and possible focus of expansions. The plurality of combinations of possible scale magnitudes and possible focus of expansions may be distributed in a three-dimensional space. In some embodiments, processing unit 110 may determine the common focus of expansion and common scale magnitude using a suitable clustering technique, such as one that may determine the center of mass (e.g., center of density) about the distribution. Processing unit 110 may determine from the distribution that the density of distribution around a particular pair of scale magnitude and focus of expansion is higher than a predetermined threshold, and may select that particular pair of scale magnitude and focus of expansion as the common scale magnitude and common focus of expansion.

Processing unit 110 may select the region of coherent expansion (i.e., the set of pixels) based on the common focus of expansion and common scale magnitude, wherein the set of pixels satisfy the relationship between pixel positions, displacement vectors, the common focus of expansion, and the common scale magnitude. The set of pixels may be selected from the first image or the second image, Based on the selected set of pixels (or the region of coherent expansion), processing unit 110 may identify the presence of a substantially upright low time-to-collision object in the first image (or the second image). For example, the set of pixels may show a portion of the substantially upright low time-to-collision object. Processing unit 110 may identify such a low time-to-collision upright object regardless of whether the object is static relative to the road, and/or regardless of the moving direction of the object, and/or regardless of whether the object has a low (e.g., short) time to collision with vehicle 200, as long as the object has a relative speed as compared to vehicle 200 such that there exists a focus of expansion for the object. The focus of expansion may not exist for the object when the object appears static in an image plane relative to vehicle 200 because there would be no expansion or shrinking in the optical flow field.

Processing unit 110 may further determine that the identified object is a crossing object (which may also be referred to as a crossing-to-impact object hereinafter) that is moving at a constant speed in a direction crossing the travel direction of vehicle 200, and which would likely collide with vehicle 200 should vehicle 200 and the crossing object continue to move at their respective constant speeds. The crossing object may be a low time-to-collision upright object. Processing unit 110 may determine whether a horizontal coordinate of the focus of expansion of the crossing object stays around a center in the horizontal dimension of the crossing object during a period of time. This may indicate that a viewing angle from a camera installed on vehicle 200 is constant. When a viewing angle is constant, if the crossing object moves linearly at a constant speed, and vehicle 200 moves linearly at a constant speed, they may collide at certain point. Thus, processing unit 110 may determine whether crossing object and vehicle 200 may collide based on a determination of whether the horizontal coordinate of the focus of expansion of the crossing object stays around a center in the horizontal dimension of the crossing object during the period of time. When processing unit 110 determines that the horizontal coordinate of the focus of expansion of the crossing object stays around a center in the horizontal dimension of the crossing object during the period of time, processing unit may cause vehicle 200 to brake using, e.g., braking system 230. In some embodiments, the braking may be autonomous without driver intervention.

Figure 8:
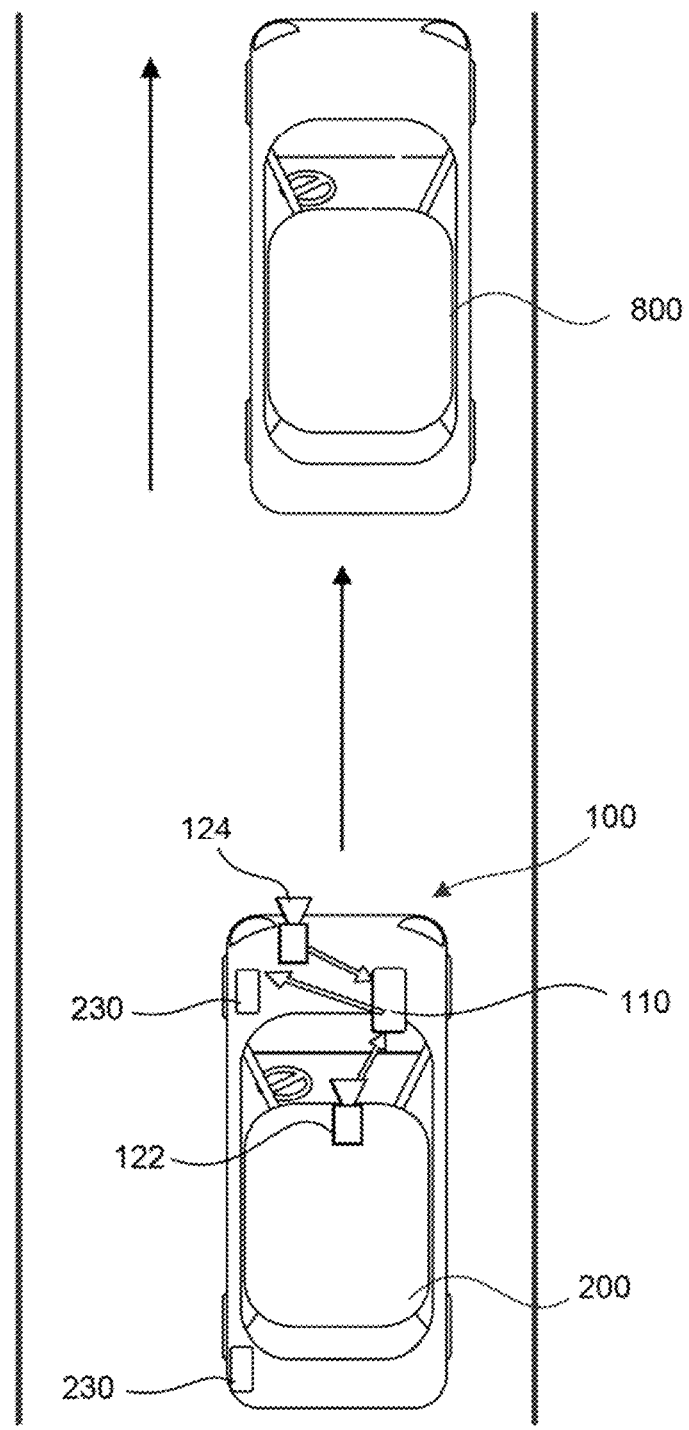
FIG. 8 is a diagrammatic representation of an exemplary vehicle including an object detecting system traveling on a road behind another vehicle consistent with the disclosed embodiments.

FIG. 8 is a diagrammatic representation of an exemplary vehicle 200 including an object detecting system (or referred to as an emergency braking decisioning system). The object detecting system may include system 100 and braking system 230. The object detecting system may also include at least one of image capture devices 122 and 124 (and 126, which is not shown in FIG. 8). The object detecting system may include processing unit 110, which may be part of system 100. At least one of image capture devices 122 and 124 may acquire one or a plurality of images of an area including an object in front of vehicle 200. The object may be another vehicle, such as a vehicle 800 that may be traveling in front of vehicle 200, or a pedestrian, an animal, etc. As shown in FIG. 8, in some embodiments, vehicle 800 may be traveling in a direction that is parallel to a traveling direction of vehicle 200. A parallel direction may include a situation in which vehicle 800 is traveling in the same direction as and in alignment or substantially in alignment with vehicle 200 (e.g., vehicle 800 traveling in front of vehicle 200), as shown in FIG. 8. A parallel direction may also include a situation in which vehicle 800 is traveling in an opposite direction relative to vehicle 200 and in alignment with vehicle 200 (e.g., vehicle 800 moving toward vehicle 200 in a direction that is 180 degrees, or substantially 180 degrees, opposite to the traveling direction of vehicle 200). A parallel direction may also include a situation in which vehicle 800 is not traveling in alignment with vehicle 200, but is traveling in a direction parallel to the traveling direction of vehicle 200 (e.g., vehicle 80 traveling on a front side of vehicle 200 at an offset distance).

In some embodiments, the object may be a pedestrian who may be standing in the road, or walking or running across the road in front of vehicle 200. The area included in the images may include other objects, such as a road surface, a house, a wall, a sign, etc., which may form a static environment. When an object is not traveling in a direction parallel to the traveling direction of vehicle 200, the traveling direction of the object may transverse or cross the traveling direction of vehicle 200 with an angle that is neither zero (or substantially zero) nor 180 degrees (or substantially 180 degrees). The images may include both moving and/or static objects.

Processing unit 110 may communicate with braking system 230 and at least one of image capture devices 122 and 124. For example, processing unit 110 may receive images from at least one of image capture devices 122 and 124, and may process the images using various methods to detect the object (e.g., another vehicle, pedestrian, or animal, etc.). Although two image capture devices 122 and 124 are shown in FIG. 8, the use of additional image capture devices (e.g., 3, 4, 5, etc., image capture devices) is consistent with the disclosed embodiments.

Figure 9:
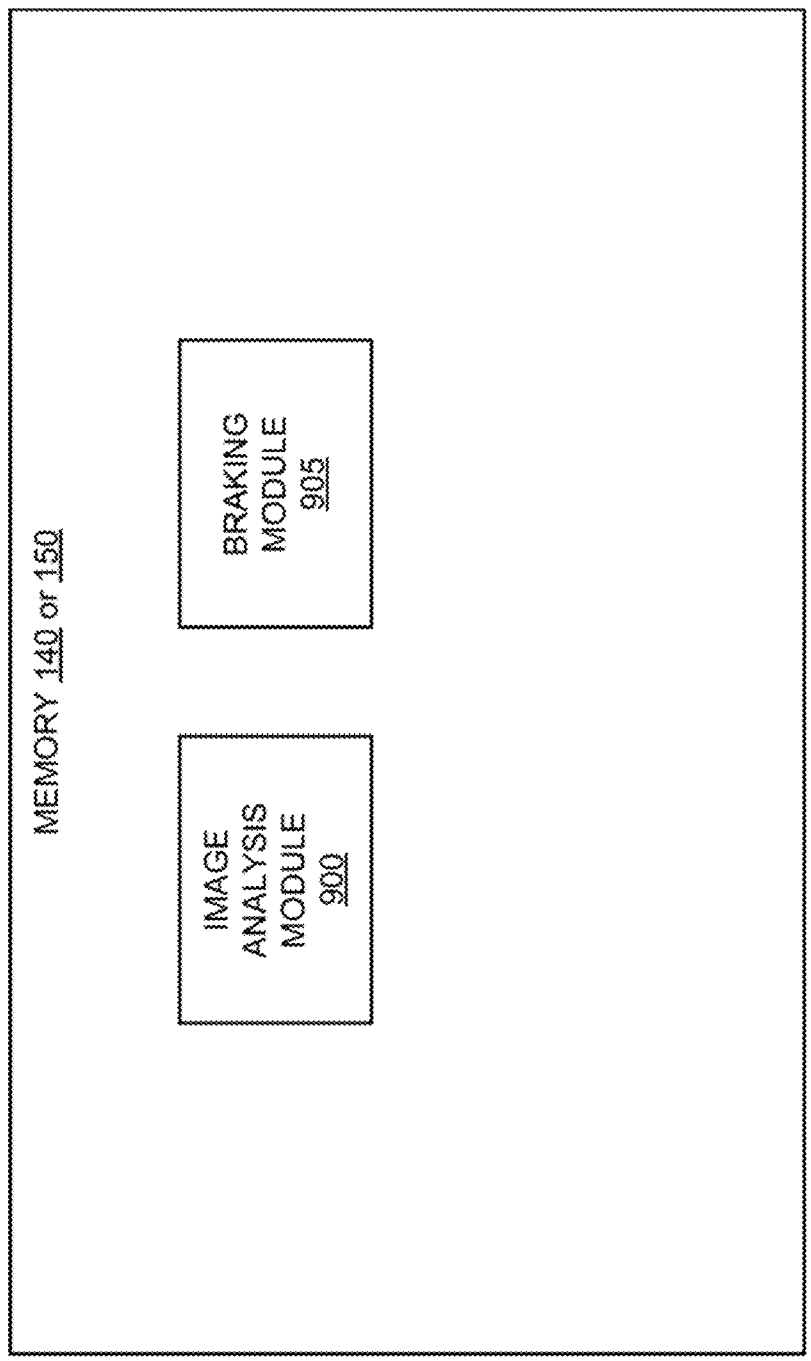
FIG. 9 is an exemplary block diagram of a memory that may store instructions for performing one or more operations for detecting an object in front of the vehicle consistent with the disclosed embodiments.

FIG. 9 is an exemplary block diagram of memory 140 or 150 that may store instructions for performing one or more operations for detecting an object in front of vehicle 200 and/or causing vehicle 200 to brake based on the detection. As shown in FIG. 9, memory 140 or 150 may store one or more modules for performing the operations, as described herein. For example, memory 140 or 150 may store an image analysis module 900 configured to analyze the images. Memory 140 or 150 may store a braking module 905 configured to cause vehicle 200 to brake by controlling, e.g., braking system 230. Application processor 180 and/or image processor 190 may execute the instructions stored in any of modules 900 and 905 included in memory 140 or 150. One of skill in the art will understand that references in the following discussions to processing unit 110 may refer to application processor 180 and image processor 190 individually or collectively. Accordingly, steps of any of the following processes may be performed by one or more processing devices.

Image analysis module 900 may store instructions which, when executed by processing unit 110, may perform an image analysis to detect an object traveling in front of vehicle 200 (e.g., vehicle 800 or a pedestrian crossing the road). Image analysis module 900 may analyze at least two images acquired by at least one of image capture devices 122 and 124. For example, image analysis module 900 may compare at least a first image to a second image to obtain optical flow information. The optical flow information may include an optical flow field formed by a plurality of displacement vectors between each first pixel in the first image and each corresponding second pixel in the second image. Image analysis module 900 may search for a region of coherent expansion that is a set of pixels in at least one of the first image and the second image, for which there exists a common focus of expansion and a common scale magnitude such that the set of pixels satisfy a relationship between pixel positions, displacement vectors, the common focus of expansion, and the common scale magnitude. Image analysis module 900 may further identify presence of a substantially upright object in at least one of the first image and the second image based on the set of pixels.

In some embodiments, image analysis module 900 may store instructions which, when executed by processing unit 110, may perform an image analysis to detect an object crossing the road in front of vehicle 200, which would likely collide with vehicle 200 if vehicle 200 and the object continue to move linearly (e.g., in a straight line) at their respective constant speeds in their respective directions that cross each other at an angle which is neither zero nor 180 degrees. Image analysis module 900 may determine whether a horizontal coordinate of the focus of expansion stays around a center in the horizontal dimension of the crossing object during a period of time.

Braking module 905 may store instructions which, when executed by processing unit 110, may cause vehicle 200 to brake using braking system 230. For example, when image analysis module 900 determines that a horizontal coordinate of the focus of expansion of the crossing object stays around a center in the horizontal dimension of the crossing object during a period of time, braking module 905 may cause vehicle 200 to brake to avoid collision with the crossing object.

Figures 10A, 10B, 10C:
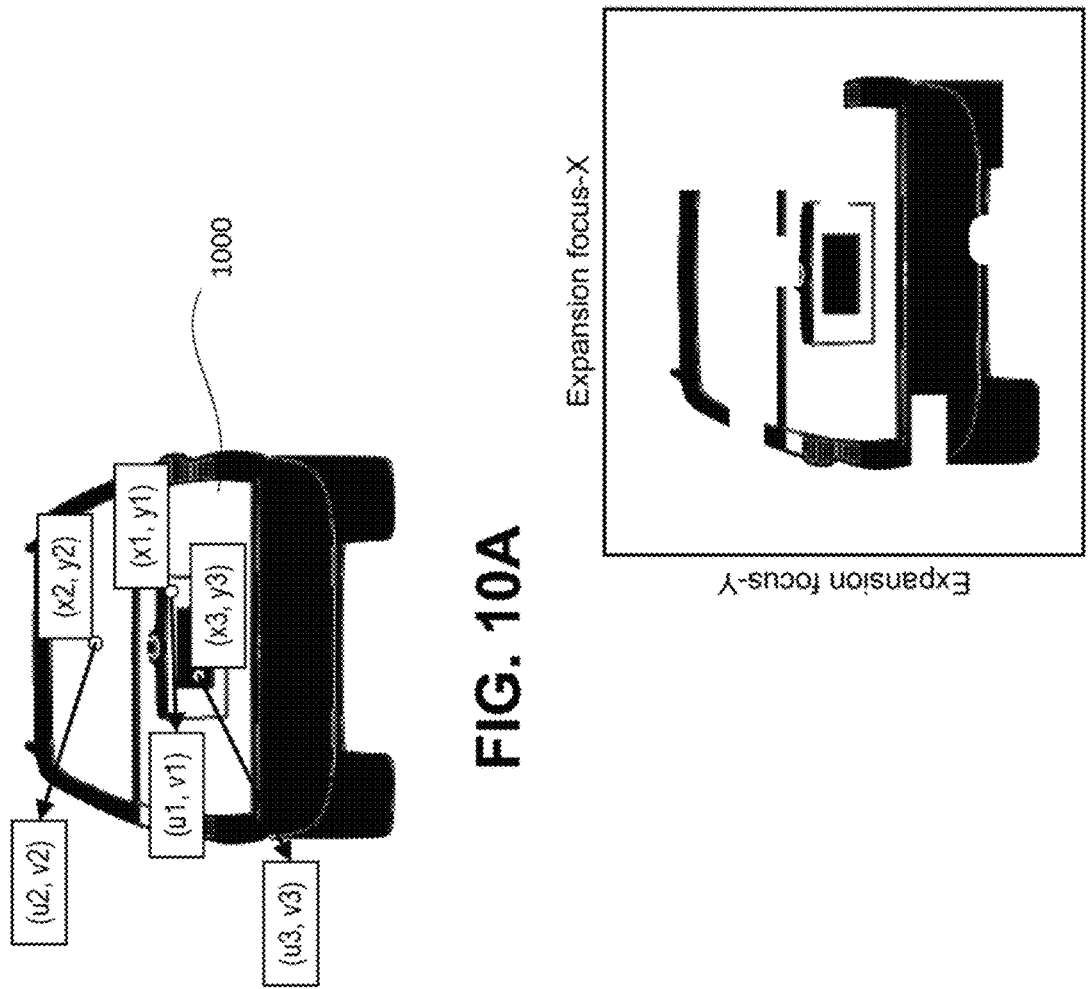
FIG. 10A is an exemplary image of an area showing vectors associated with pixels consistent with the disclosed embodiments.
FIG. 10B is a schematic illustration of an exemplary relationship between the focus of expansion and the scale magnitude consistent with the disclosed embodiments.
FIG. 10C shows an exemplary method of identifying a substantially upright object based on selected pixels consistent with the disclosed embodiments.

FIG. 10A is an exemplary image of an area showing vectors associated with pixels. Although only one image of a vehicle 1000 is shown for illustration purposes, it is understood that a plurality of image may be acquired by one of the image capture devices 122-126 at a time interval after the first image is acquired. Processing unit 110 may compare a first image to a second image to obtain optical flow information including a vector field formed by a plurality of vectors, each vector representing displacement (or movement) associated with each first pixel in the first image and each corresponding second pixel in the second image. The vectors may also be referred to as displacement vectors. In the example displacement vector field shown in FIG. 10A, coordinates of three pixels in the first image are shown (x1, y1), (x2, y2), and (x3, y3). Displacement vectors are shown as arrows. Coordinates (u1, v1), (u2, v2), and (u3, v3) may represent horizontal and vertical displacements associated with each displacement vector, or may represent coordinates of corresponding second pixels on the second image in some embodiments.

Processing unit 110 may search for a region of coherent expansion that is a set of pixels in at least one of the first image and the second image, for which there exists a common focus of expansion and a common scale magnitude such that the set of pixels satisfy a relationship between pixel positions, displacement vectors, the common focus of expansion, and the common scale magnitude. The relationship may be expressed as equations (1) and (2) for an ith pixel in the first image (or in the second image) having coordinates (xi, yi), where i is a integer number:

$$SS*(x_i - FOE_x) = u_i \quad (1)$$

$$SS*(y_i - FOE_y) = v_i \quad (2)$$

Where SS is the scale magnitude, $FOE_x$ and $FOE_y$ are coordinates of the focus of expansion. Because SS, $FOE_x$, and $FOE_y$ are unknown variables, there may be an infinite number of possible solutions for equations (1) and (2). The possible solutions of equations (1) and (2) may be distributed in a three-dimensional cube space shown in FIG. 10 (which may represent a portion of the infinite space), where the x axis represents $FOE_x$, and the y-axis represents $FOE_y$, and the z-axis represents scale magnitude SS. There may exist a set of pixels among the pixels of the first image (or the second image) for which there exists a pair of common scale magnitude SS0 and common focus of expansion ($FOE_{x0}$, $FOE_{y0}$) such that all or most of the set of pixels satisfy the relationship represented by equations (1) and (2) with SS being replaced by common scale magnitude SS0 and $FOE_x$ and $FOE_y$ being replaced by $FOE_{x0}$, $FOE_{y0}$ of the common focus of expansion. This set of pixels may be referred to a region of coherent expansion. The pixels in the region of coherent expansion may share the same common scale magnitude and the same focus of expansion.

A plurality of methods may be used to determine a common focus of expansion from the plurality of focuses of expansion. For example, a clustering technique may be used to determine the standard deviation of the distribution, the center of mass, or the center of the density of distribution. Such information obtained using the clustering technique may be used to determine the common scale magnitudes, SS0, and the common focus of expansion ($FOE_{x0}$, $FOE_{y0}$).

In one embodiment, the three-dimensional cube space shown in FIG. 10B may be divided into a plurality of cells, each cell corresponding to a small range corresponding to a pair of ($SS_i$, $FOE_{xi}$, $FOE_{yi}$). Processing unit 110 may place the possible solutions into the cells and count the number of solutions within the cells. Processing unit 110 may determine which cell has the largest number of solutions. In one embodiment, the cell has the largest number of solutions may be used to determine the common focus of expansion and the common scale magnitude.

In another embodiment, processing unit 110 may one variable, such as one of the scale magnitude SS, $FOE_x$, or $FOE_y$, and solve the equations (1) and (2) for possible solutions for each pixel, Processing unit 110 may repeat this for all or a plurality of pixels in the first image to generate a plurality of possible solutions. The plurality of possible solutions (SS, $FOE_x$, $FOE_y$) may be arranged into a list or an array. Processing unit 110 may determine a distribution of the possible solutions using, e.g., a clustering technique, to find a dense clustering. For example, if the density around a particular solution (SS, $FOE_x$, $FOE_y$) is higher than a predetermined threshold, processing unit 110 may use that particular solution as the common focus of expansion and common scale magnitude for the plurality of pixels in the first image.

In some embodiments, processing unit 110 may determine whether the possible solutions "agree" with each other, e.g., whether all or most of the solutions or more than a predetermined number of solutions are located within a predetermined small space in the three-dimensional cube space shown in FIG. 10B. If the possible solutions "agree" with each other, processing unit 110 may determine the common focus of expansion and the commons scale magnitude based on the possible solutions within the predetermined space (e.g., taking the average of the all solutions within the predetermined space as the common scale magnitude and the common focus of expansion).

Based on the common focus of expansion and the common scale magnitude, processing unit 110 may identify the set of pixels that satisfy the relationship represented by equations (1) and (2) with the common scale magnitude and common focus of expansion. In other words, processing unit 110 may identify the set of pixels that share the common scale magnitude and the common focus of expansion. Processing unit 110 may detect the presence of an object, such as an upright object low time-to-collision object (e.g., a back door of a van shown in FIG. 10C) based on the identified set of pixels. For example, the identified set of pixels may show an image of a substantial portion of the upright object (e.g., the back door of the van), as shown in FIG. 10C.

Figure 11:
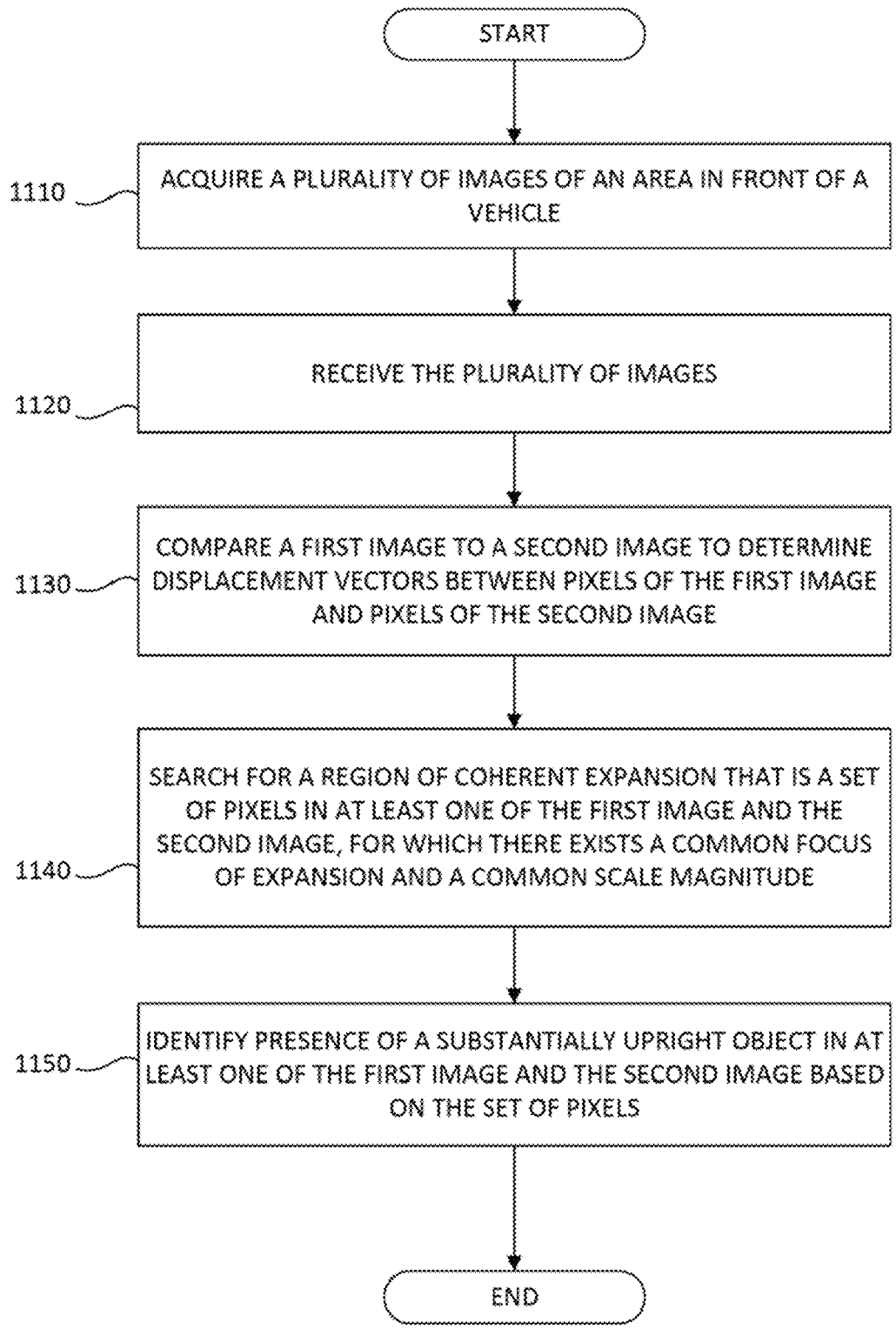
FIG. 11 is a flowchart showing an exemplary process for detecting presence of an object in front of the vehicle consistent with the disclosed embodiments.

FIG. 11 is a flowchart showing an exemplary process for detecting presence of an object in front of vehicle 200. Method 1100 may include acquiring a plurality of images of an area in front of vehicle 200 (step 1110). For example, at least one of image capture devices 122 and 124 may acquire one or more images of an area in front of vehicle 200. The area may include an object, such as another vehicle or a pedestrian. The area may include other static objects, such as a sign, a house, a mountain, a road surface etc., which may form a static environment.

Method 1100 may include receiving the plurality of images (step 1120). For example, processing unit 110 may receive the plurality of images from at least one of the image capture devices 122 and 124. Method 1100 may also include comparing a first image to a second image to determine displacement vectors between pixels of the first image and pixels of the second image (step 1130). The first and second images are from the plurality of images, and may be acquired at a predetermined time interval, such as 0.01 second, 0.02 second, etc. Processing unit 110 may compare the first image and second image to obtain optical flow information, which may include displacement vectors between pixels of the first image and pixels of the second image. A displacement vector indicates a direction and a magnitude of displacement between a first pixel in the first image and a second pixel in the second image. The displacement vectors may converge into one or more common converging points, which may also be referred to as common focus of expansions. Processing unit 110 may determine the common focus of expansion based on any of the methods disclosed herein.

Method 1100 may further include searching for a region of coherent expansion that is a set of pixels in at least one of the first image and the second image, for which there exists a common focus of expansion and a common scale magnitude such that the set of pixels satisfy a relationship between pixel positions, displacement vectors, the common focus of expansion, and the common scale magnitude (step 1140). For example, processing unit 110 may search for the set of pixels that satisfy the relationship represented by equations (1) and (2) with the common focus of expansion and the common scale magnitude. Based on the set of pixels, processing unit 110 may identify the presence of a substantially upright object in at least one of the first image and the second image (step 1150). The upright object may be low time-to-collision object, such as a moving vehicle or pedestrian with which vehicle 200 may collision at a future time.

Figure 12A:
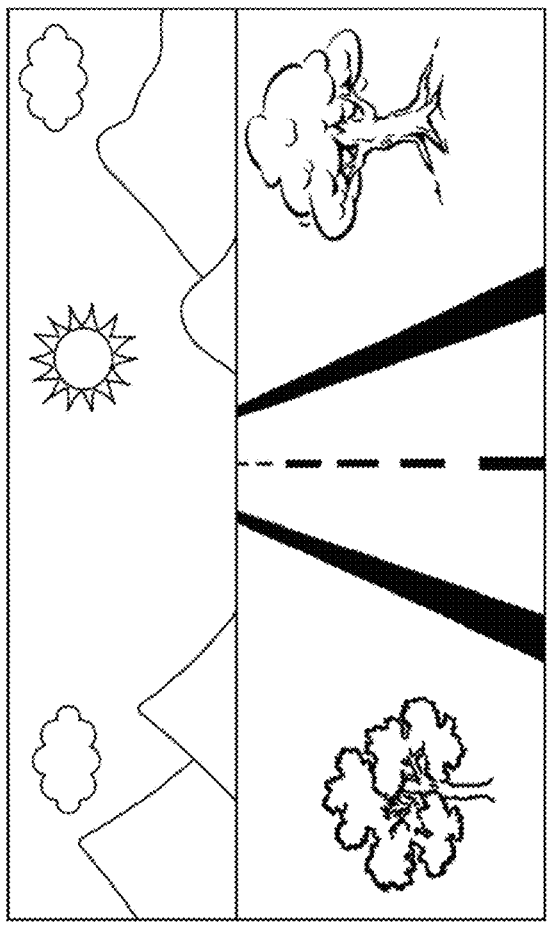
FIG. 12A is an image of a static environment consistent with the disclosed embodiments.
Figure 12B:
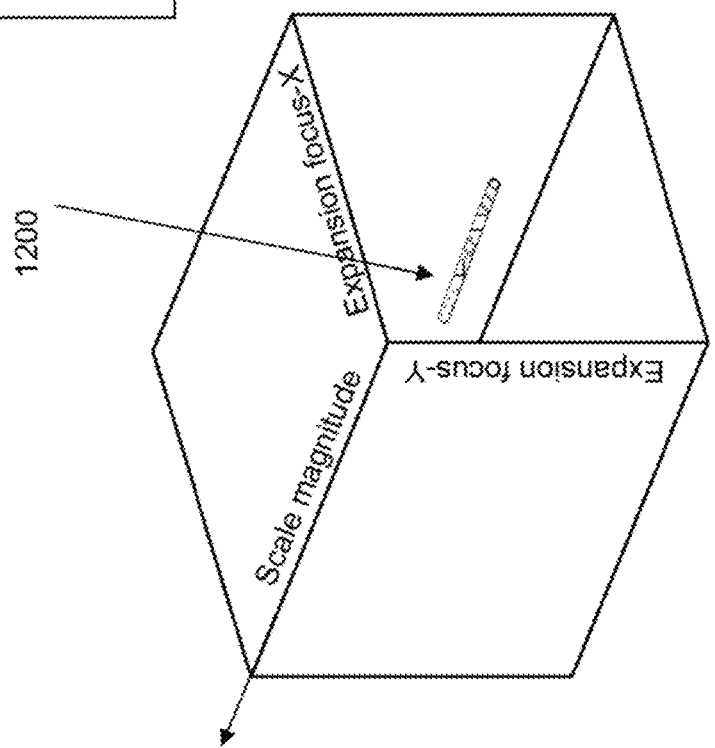
FIG. 12B is a three-dimensional cube space illustrating an exemplary relationship between the focus of expansion and the scale magnitude corresponding to the static environment of FIG. 12A consistent with the disclosed embodiments.

FIG. 12A is an image of a static environment captured by at least one of image capture devices 122 and 124 installed on vehicle 200. The static environment may include a road, one or more trees along the road, and a portion of the sky. FIG. 12B shows a three-dimensional cube space illustrating the relationship between the focus of expansion and the scale magnitude. The cube space shows a space where possible solutions of (SS, $FOE_x$, $FOE_y$) may be distributed. As shown in FIG. 12B, distribution of the scale magnitudes and focus of expansions of different objects in the static environment may be represented by a cylindrical shape 1200 (or a straight line; the cylindrical shape is only for illustration purposes). Different objects in the image of the static environment may have different distances to the camera on vehicle 200. Thus, the scale magnitudes may be different for different objects in the image of the static environment. As indicated by the cylindrical shape 1200 in FIG. 12B, objects in the static environment sham the same focus of expansion.

Figure 13A:
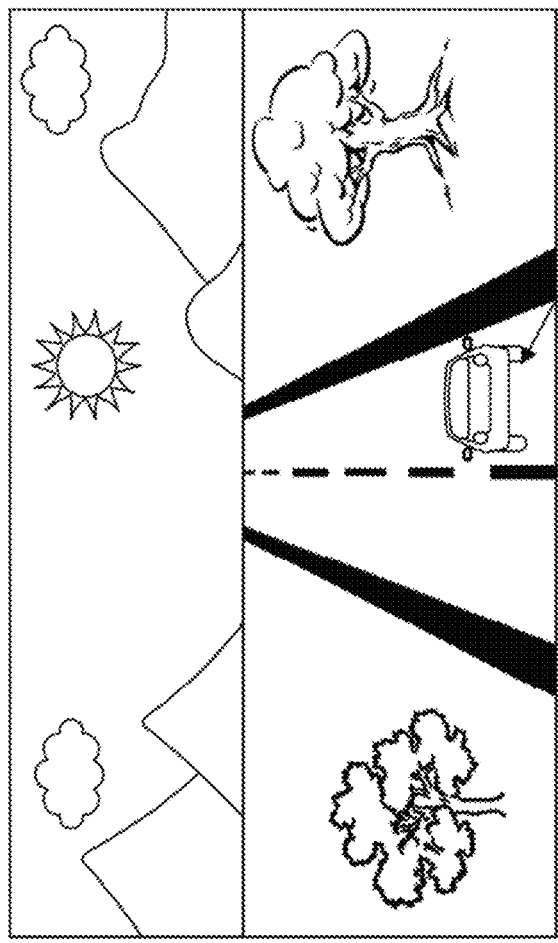
FIG. 13A is an image of a environment having another vehicle static in the environment or traveling in a direction parallel to the traveling direction of the vehicle where object detecting system is installed consistent with the disclosed embodiments.
Figure 13B:
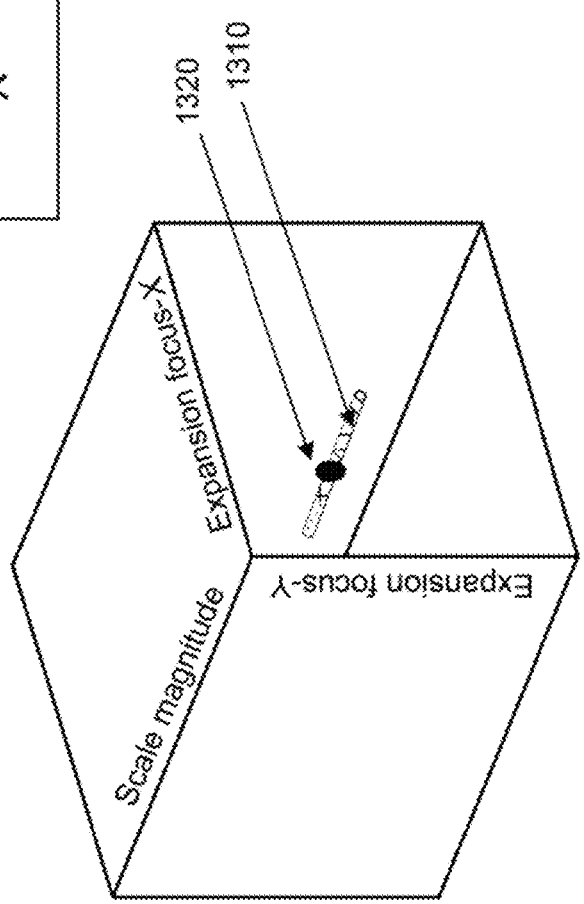
FIG. 13B is a three-dimensional cube space illustrating an exemplary relationship between the focus of expansion and the scale magnitude corresponding to the image of FIG. 13A consistent with the disclosed embodiments.

FIG. 13A is an image of a environment having another vehicle 1300 in front of vehicle 200. The object vehicle 1300 may be static relative to the road or may be moving in a direction parallel to the traveling direction of vehicle 200. As shown in FIG. 13B, the distribution of the scale magnitude and focus of expansion of different objects in the static environment may be represented by a cylindrical shape 1310. The focus of expansion of object vehicle 1300 may be represented by the circle 1320 centered on the cylindrical shape 1310 at a certain scale magnitude. In other words, the focus of expansion of object vehicle 1300 is the same as the focus of expansion of the static environment.

Figure 13C:
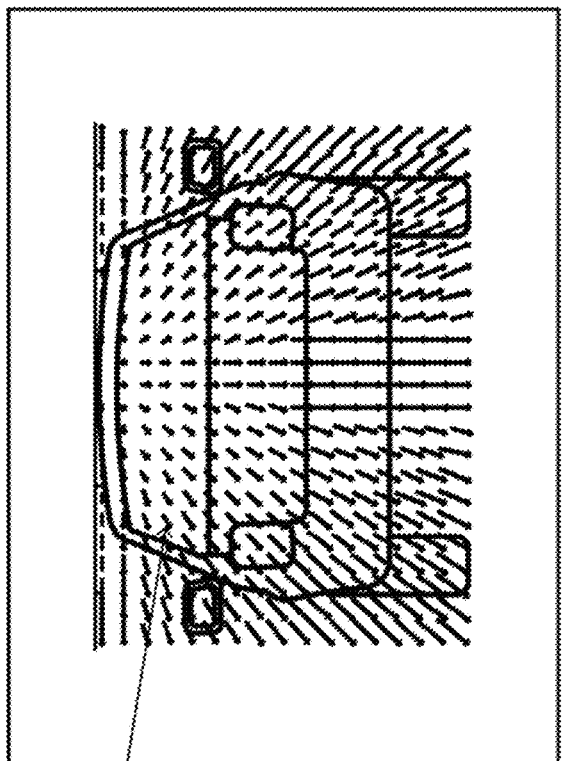
FIG. 13C is an image of a environment having another vehicle traveling longitudinally in front of and in alignment with the vehicle where object detecting system is installed consistent with the disclosed embodiments.
Figure 13D:
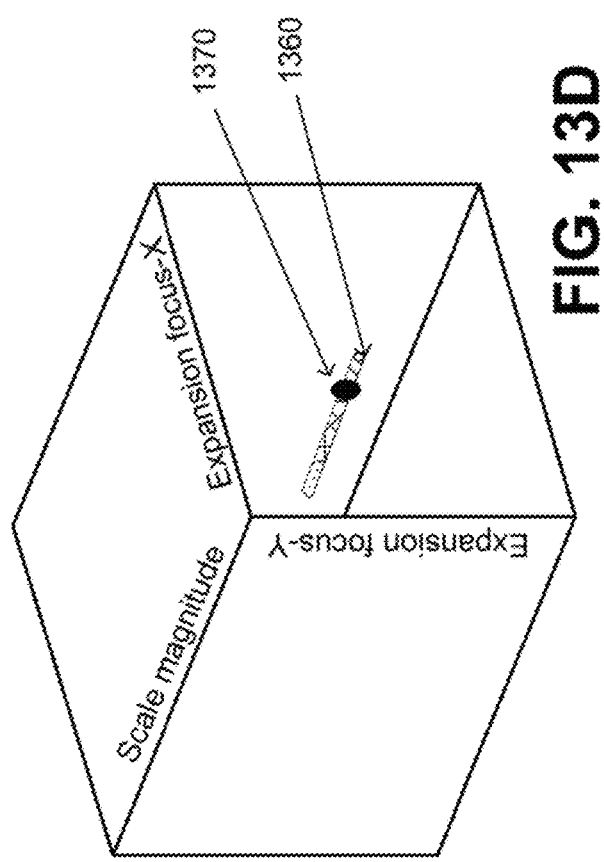
FIG. 13D is a three-dimensional cube space illustrating an exemplary relationship between the focus of expansion and the scale magnitude corresponding to the image of FIG. 13C consistent with the disclosed embodiments.

FIG. 13C is an image of a environment having another object vehicle 1350 traveling longitudinally in front of and in alignment with vehicle 200. As shown in FIG. 13D, the distribution of scale magnitudes and focus of expansions for different objects in the static environment may be represented by a cylindrical shape 1360. The focus of expansion of object vehicle 1350 may be represented by a circle 1370 centered on the cylindrical shape 1360 at a certain scale magnitude. In other words, the focus of expansion of object vehicle 1350 is the same as the focus of expansion of the static environment.

Figure 14A:
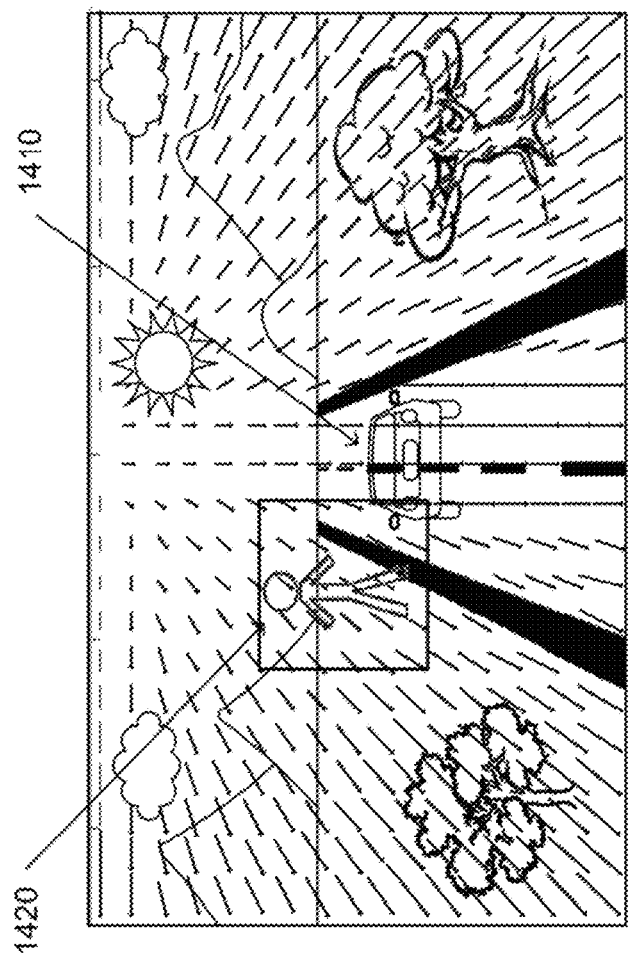
FIG. 14A is an image of an environment superimposed with an exemplary optical flow field consistent with the disclosed embodiments.

FIG. 14A is an image of an environment superimposed with an exemplary optical flow field (e.g., the displacement vector field). The image of the environment may include an object vehicle 1410 and a pedestrian 1420, who may be crossing the road or standing still on the road. An optical flow field having a plurality of vectors is superimposed to the figure to indicate that an optical flow field may be obtained from at least two images of the environment with object vehicle 1410 and pedestrian 1420 acquired at two different times.

Figure 14B:
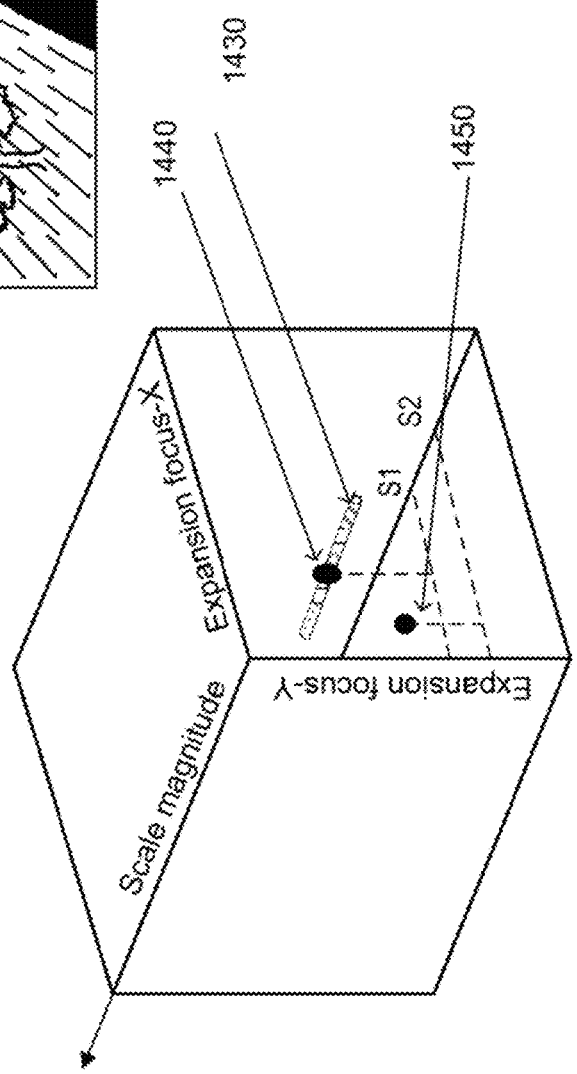
FIG. 14B is a three-dimensional cube space illustrating two exemplary focuses of expansion corresponding to the vehicle object and the pedestrian object shown in FIG. 14A consistent with the disclosed embodiments.

FIG. 14B is a three-dimensional cube space illustrating two exemplary focus of expansions corresponding to the vehicle object and the pedestrian object shown in FIG. 14A. As shown in FIG. 14B, the distribution of scale magnitude and focus of expansion of different objects in the static environment may be represented by a cylindrical shape 1430. The focus of expansion of object vehicle 1410 may be represented by a circle 1440 centering around the cylindrical shape 1430 at a certain scale magnitude, indicating that the focus of expansion of object vehicle 1410 is the same as the focus of expansion of the static environment. FIG. 14B also shows a focus of expansion of pedestrian 1420, as indicated by the circle 1450. The focus of expansion of pedestrian 1420 may be located offset from the focus of expansion of the static environment and the focus of expansion of object vehicle 1410, which means at least one of the horizontal and the vertical coordinate of focus of expansion of pedestrian 1420 may be different from that of the focus of expansion of the static environment and/or object vehicle 1410. The focus of expansion of pedestrian 1420 may be located on a plane corresponding to a first common scale magnitude, which may be different from a second common scale magnitude corresponding to the focus of expansion of object vehicle 1410.

Figure 15A:
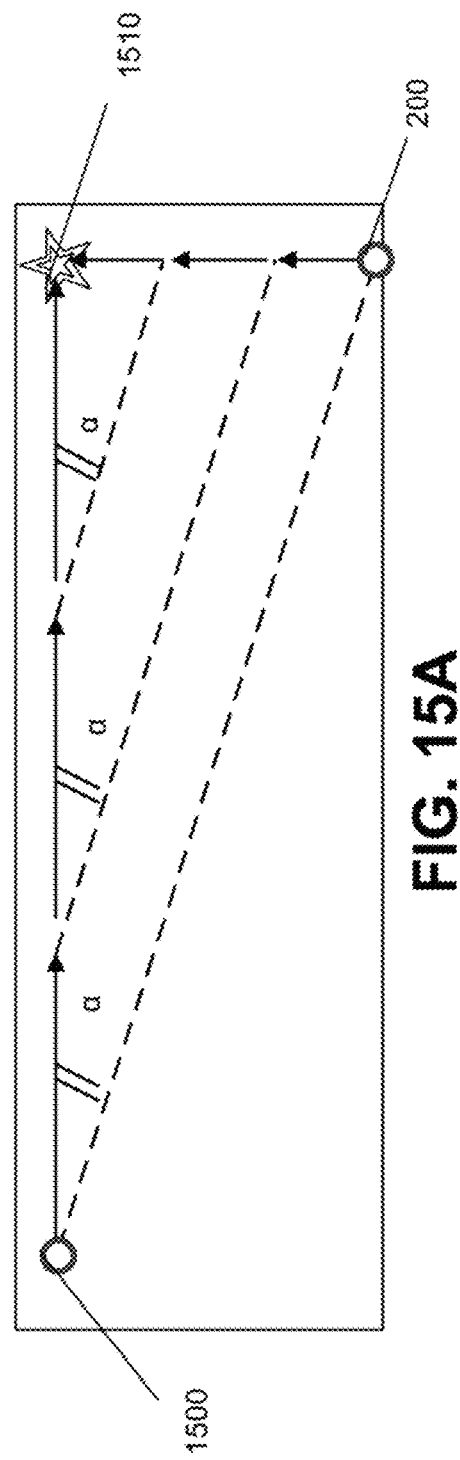
FIG. 15A shows a diagram illustrating an exemplary method of detecting a crossing-to-impact object consistent with the disclosed embodiment.

In some embodiments, system 100 may detect an object crossing the road in front of vehicle 200, and may cause vehicle 200 to brake to avoid collision. Such an object may be referred to as a crossing object or a crossing-to-impact object, which may have a low time to collision with vehicle 200. The crossing object may likely collide with vehicle 200 if the crossing object and vehicle 200 continue to move in their current linear directions at their current substantially constant speed. FIG. 15A shows a diagram illustrating an exemplary method of detecting a crossing-to-impact object. A crossing object 1500 may travel in a direction that crosses the travel direction of vehicle 200. If crossing object 1500 and vehicle continue to travel at their respective substantially constant speeds, the viewing angle from the camera installed on vehicle 200, α, will remain constant as crossing object 1500 and vehicle 200 travel to point 1510. They may likely collide in a future time at point 1510. System 100 may detect such a cross-to-impact object and may take actions to avoid collision by, for example, braking vehicle 200 before vehicle 200 and crossing object 1500 reach the collision point 1510. Although FIG. 15A shows that crossing object 1500 and vehicle 200 travel in directions that are perpendicular to each other, their directions do not have to be perpendicular. For example, the angle between the direction of travel of crossing object 1500 and vehicle 200 may be any suitable value, such as 60 degrees, 45 degrees, etc.

In some embodiments, a constant viewing angle may be detected based on the optical flow information. For example, when object 1500 moves with a constant viewing angle, the object may appear fixed horizontally in an image plane and expands in a direction perpendicular to the image plane. When object 1500 moves with a constant viewing angle, the object 1500 may have a focus of expansion, which may stay around a center in the horizontal dimension of object 130. Processing unit 110 may use such information to determine whether object 1500 may collide with camera installed on vehicle 200.

Figure 15B:
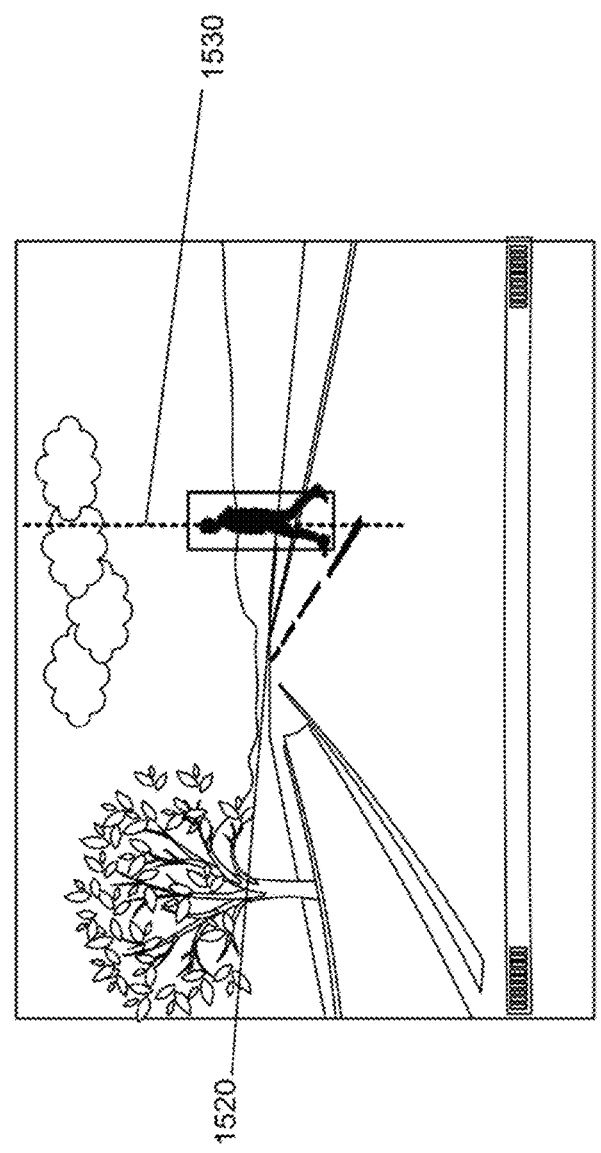
FIG. 15B shows an image having a pedestrian crossing the road in front of the vehicle consistent with the disclosed embodiment.
Figure 15C:
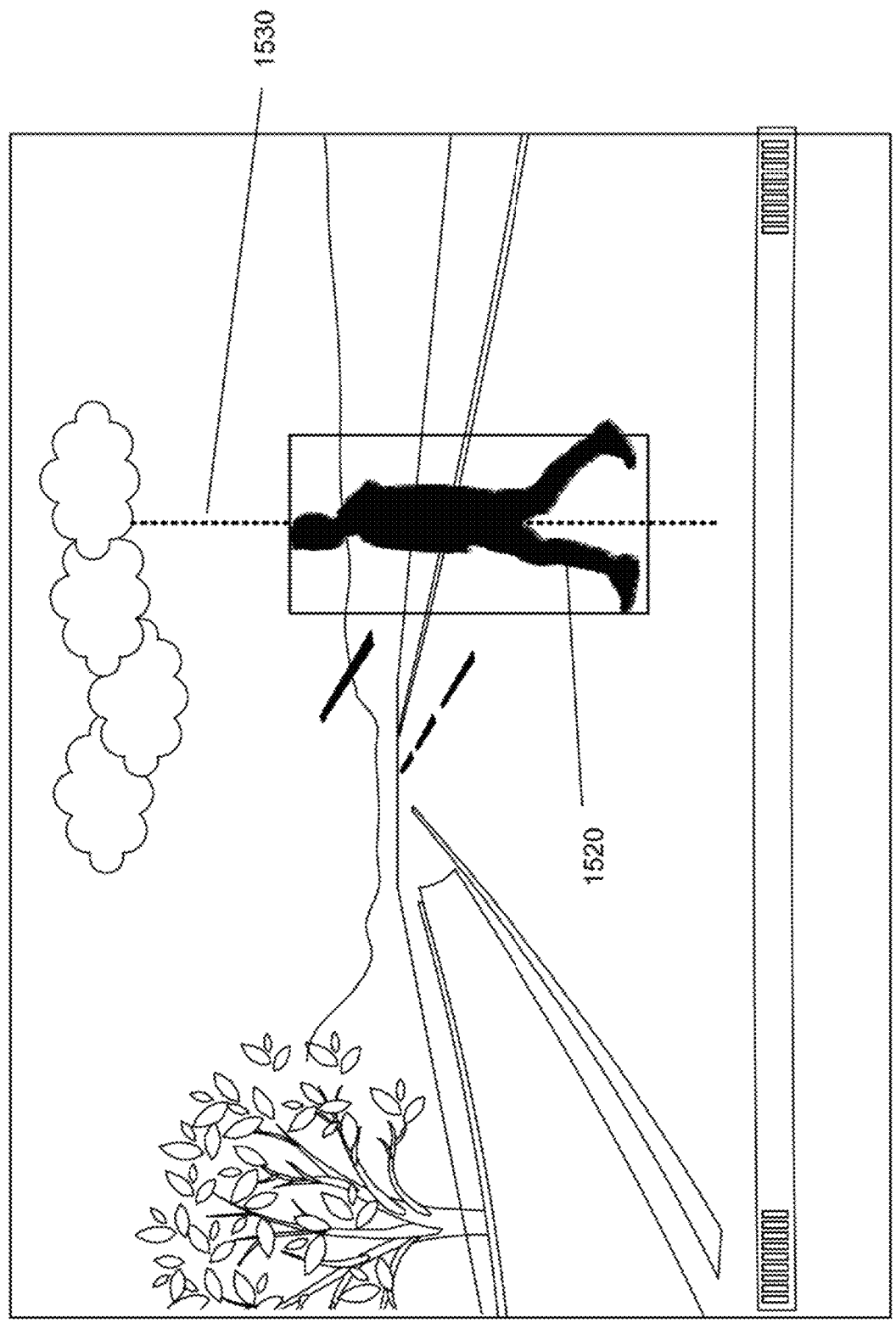
FIG. 15C shows an image having a pedestrian crossing the road in front of the vehicle acquired at a time after the image shown in FIG. 15B is acquired, consistent with the disclosed embodiments.

FIG. 15B shows an image having a pedestrian 1520 (an exemplary crossing object) crossing the road in front of vehicle 200. FIG. 15C shows an image having the pedestrian 1520 crossing the road in front of vehicle 200 acquired at a time after the image shown in FIG. 15B is acquired (thus, pedestrian 1520 appears larger in FIG. 15C than in FIG. 15B). A vertical dotted line 1530 in FIG. 15B and FIG. 15C indicates the horizontal coordinate of the focus of expansion of pedestrian 1520. If processing unit 110 detects that the vertical line 1530 stays around a center in the horizontal dimension of pedestrian 1520 and does not move away from the center in the horizontal direction during the period of time from the first image (e.g., FIG. 15B) to the second image (e.g., FIG. 15C), processing unit 110 may determine that a viewing angle from the camera (e.g., one in the image capture device 122, 124, or 126) installed in vehicle 200 is constant. A constant viewing angle may indicate that there is a high likelihood that vehicle 200 and pedestrian 1520 will collide if they continue to move linearly at substantially constant speeds in their respective directions that cross each other. When processing unit 110 determines that the horizontal coordinate of the focus of expansion of pedestrian 1520, as indicated by the vertical line 1530, stays around the center in the horizontal dimension of pedestrian 1520, processing unit 110 may cause vehicle 200 to brake to avoid the collision as vehicle 200 approaches pedestrian 1520. If processing unit 110 detects that the line 1530 does not stay around the center in the horizontal dimension of pedestrian 1520 (e.g., moves away from the center), which may indicate that the viewing angle is not constant, processing unit 110 may not cause vehicle 200 to brake because the likelihood to have a collision may not be high.

Figure 16:
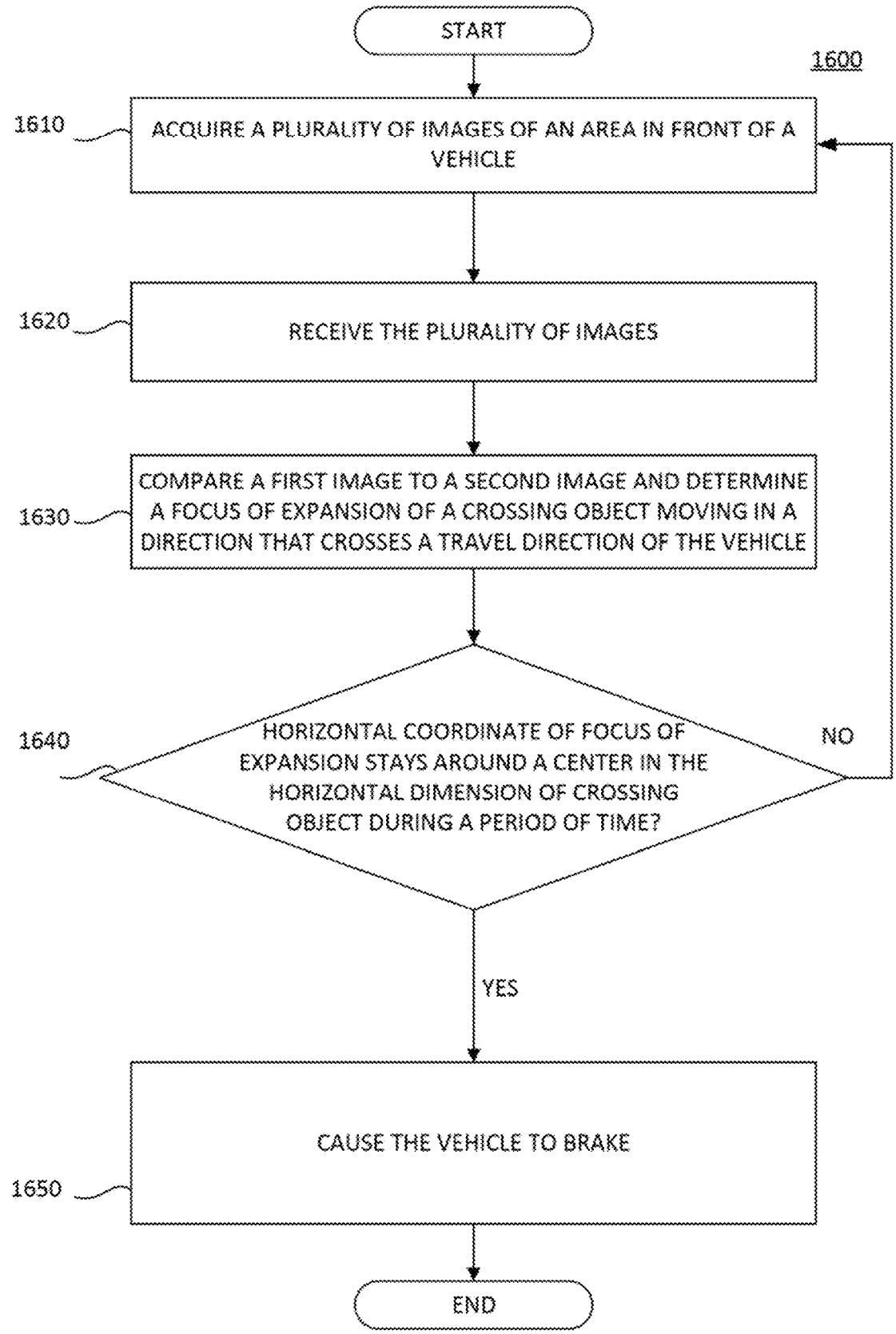
FIG. 16 is a flowchart showing an exemplary process for detecting an object in front of the vehicle consistent with the disclosed embodiments.

FIG. 16 is a flowchart showing an exemplary process for detecting an object in front of vehicle 200. Method 1600 may include acquiring a plurality of images of an area in front of vehicle 200 (step 1610). For example, at least one of image capture devices 122-126 may capture the plurality of images of the area in front of vehicle 200 at a predetermined interval, such as, for example, 0.01 second, 0.02 second, etc. Method 1600 may also include receiving the plurality of images (step 1620). For example, processing unit 110 may receive the plurality of images from at least one of image capture devices 122-126. Method 1600 may also include comparing a first image to a second image to determine a focus of expansion of a crossing object moving in a direction that crosses a travel direction of the vehicle (step 1630). For example, processing unit 110 may compare the first and second images to obtain optical flow information, which includes displacement vectors relating to each first pixel in the first image and a corresponding second pixel in the second image. Processing unit 110 may determine the focus of expansion based on the optical flow information.

Method 1600 may also include determine whether a horizontal coordinate of the focus of expansion stays around a center in the horizontal dimension of the crossing object during a period of time (step 1640). Processing unit 110 may compare the horizontal coordinate of the focus of expansion of the crossing object with the horizontal center (i.e., horizontal coordinate) of the crossing object in the image, and determine whether they are the same or substantially the same (e.g., within a small error, such as one or two pixels). When processing unit 110 determines that the horizontal coordinate stays around the center in the horizontal dimension of the crossing object during the period of time (Yes, step 1640), processing unit 110 may cause vehicle 200 to brake using, e.g., braking system 230, to avoid collision with the crossing object (step 1650). When processing unit 110 determines that the horizontal coordinate does not stay within the crossing object during the period of time (No, step 1640), processing unit 110 may executes steps 1610-1630.

The situation shown in FIG. 15A assumes that vehicle 200 and crossing object 1500 may be represented by points. In reality, when camera is installed on vehicle 20, which may not be treated as a point, the method discussed above for detecting a crossing-to-impact object may be generalized to take into account the sizes of vehicle 200 and the crossing object 1500. The generalized method may provide a visual indication of potential collision with a target object. For example, an image space of a target object may be extrapolated using any suitable extrapolation method to predict a future location of that target object in an image space, in a future time, relative to vehicle 200, thereby showing a boundary for avoiding collision with the target object.

Figure 17:
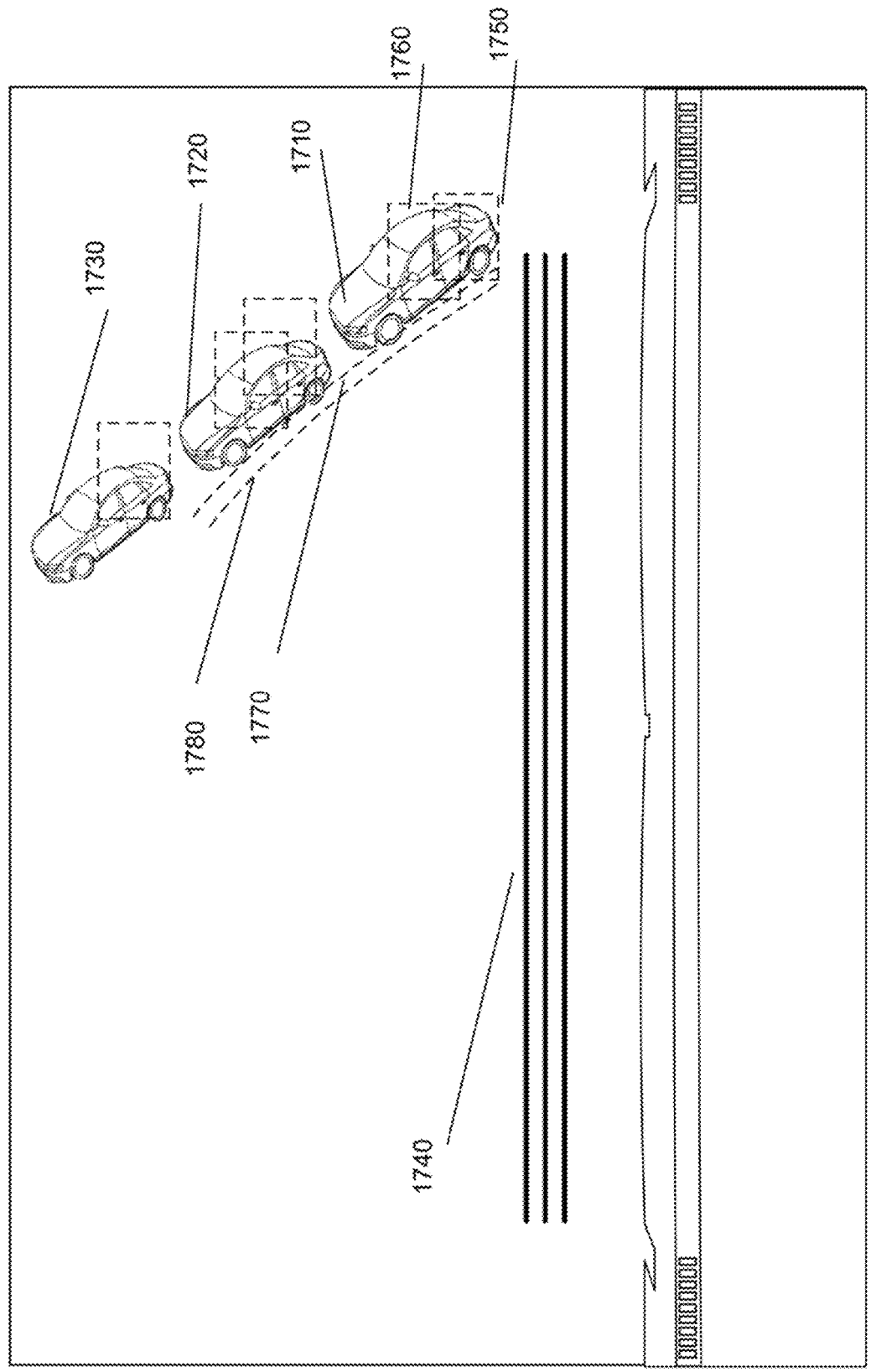
FIG. 17 illustrates an exemplary method of detecting an object consistent with the disclosed embodiments.

As shown in FIG. 17, as vehicle 200 drives along the road where object vehicles 1710, 1720, 1730 are parked, images of vehicles 1710, 1720, 1730 may be extrapolated in time to predict the future position of vehicles 1710, 1720, and 1730 relative to vehicle 200 in the image space. For example, an image of a portion of vehicle 1710 within a box 1750 may be extrapolated in time to produce a predicted relative position of vehicle 1710, as indicated by box 1760. Similar extrapolation may be performed based on images of vehicles 1720 and 1730. Lines 1770 and 1780 may be superimposed on the real-time image captured by one of the image capture devices 122-126 to show the predicted boundary for avoiding potential collision with parked vehicles 1710-1730. To further assist the driver to prevent collision, in some embodiments, one or more lines 1740 representing a position of the front bumper of vehicle 200 may be superimposed in the live, real-time image. Thus, when lines 1740 representing the front bumper do not touch the boundary lines 1770 and/or 1780, it provides an indication to the driver that vehicle 200 is at a safe distance from vehicles 1710-1730 to avoid collision. If lines 1740 touch the boundary lines 1770 and/or 1780, it may indicate that vehicle 200 has a potential to collide with at least one of parked vehicle 1710, 1720, or 1730, and system 100 may provide a visual and/or audio warning to the driver.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media. DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An object detecting system for a vehicle, comprising:
   at least one image capture device configured to acquire a plurality of images of an area in front of the vehicle;
   a data interface; and
   at least one processing device programmed to:
   receive the plurality of images via the data interface;
   compare a first image to a second image, and based on the comparison, determine a focus of expansion of an object in the area in front of the vehicle;
   determine a boundary associated with the object based on at least one of the first image or the second image;
   determine, based on the focus of expansion, a predicted future boundary associated with the object; and
   determine, based on the predicted future boundary, whether the vehicle is expected to collide with the object.

2. The object detecting system of claim 1, wherein determining the focus of expansion comprises obtaining optical flow information based on the first and second images.

3. The object detecting system of claim 2, wherein the optical flow information includes a plurality of displacement vectors associated with a set of corresponding pixels between the first and second images.

4. The object detecting system of claim 3, wherein the focus of expansion represents a converging point for the plurality of displacement vectors.

5. The object detecting system of claim 1, wherein the at least one processing device is further programmed to:
   search for a region of coherent expansion comprising a set of pixels in at least one of the first image and the second image for which there exists a common focus of expansion and a common scale magnitude such that the set of pixels satisfy a relationship between pixel positions, displacement vectors, the common focus of expansion, and the common scale magnitude; and
   identify presence of the object in at least one of the first image or the second image based on the set of pixels.

6. The object detecting system of claim 1, wherein the boundary comprises a bounding box surrounding the object.

7. The object detecting system of claim 1, wherein the object is a parked vehicle.

8. The object detecting system of claim 1, wherein the at least one processing device is further programmed to superimpose the predicted future boundary in an image space.

9. The object detecting system of claim 8, wherein the at least one processing device is further programmed to superimpose in the image space a line representing an expected position of a bumper of the vehicle at a time associated with the predicted future boundary.

10. The object detecting system of claim 9, wherein determining whether the vehicle is expected to collide with the object comprises determining whether the line interferes with the predicted future boundary.

11. The object detecting system of claim 1, wherein the at least one processing device is further programmed to provide at least one of a visual or audio warning to a driver of the vehicle based on a determination that the vehicle is expected to collide with the object.

12. A method for detecting an object in front of a vehicle, comprising:
    receiving the plurality of images via the data interface;
    comparing a first image to a second image, and based on the comparison, determine a focus of expansion of an object in the area in front of the vehicle;
    determining a boundary associated with the object based on at least one of the first image or the second image;
    determining, based on the focus of expansion, a predicted future boundary associated with the object; and
    determining, based on the predicted future boundary, whether the vehicle is expected to collide with the object.

13. The method of claim 12, wherein determining the focus of expansion comprises obtaining optical flow information based on the first and second images.

14. The method of claim 13, wherein the optical flow information includes a plurality of displacement vectors associated with a set of corresponding pixels between the first and second images.

15. The method of claim 14, wherein the focus of expansion represents a converging point for the plurality of displacement vectors.

16. The method of claim 12, wherein the method further comprises:
    searching for a region of coherent expansion comprising a set of pixels in at least one of the first image and the second image for which there exists a common focus of expansion and a common scale magnitude such that the set of pixels satisfy a relationship between pixel positions, displacement vectors, the common focus of expansion, and the common scale magnitude; and identifying a presence of the object in at least one of the first age or the second image based on the set of pixels.

17. The method of claim 12, wherein the method further comprise superimposing the predicted future boundary in an image space.

18. The method of claim 12, wherein the at least one processing device is further programmed to provide at least one of a visual or audio warning to a driver of the vehicle based on a determination that the vehicle is expected to collide with the object.

19. The method of claim 18, wherein determining whether the vehicle is expected to collide with the object comprises determining whether the line interferes with the predicted future boundary.

20. The method of claim 19, wherein the method further comprises superimposing in the image space a line representing an expected position of a bumper of the vehicle at a time associated with the predicted future boundary.

* * * * *

UNITED STATES PATENT AND TRADEMARK OFFICE
CERTIFICATE OF CORRECTION

PATENT NO. : 11,216,675 B2
APPLICATION NO. : 17/082363
DATED : January 4, 2022
INVENTOR(S) : Amnon Shashua et al.

It is certified that error appears in the above-identified patent and that said Letters Patent is hereby corrected as shown below:

In the Claims

In Claim 16, Column 39, Line 4, "first age" should read --first image--.

In Claim 17, Column 39, Lines 5-6, "the method further comprise" should read --the method further comprises--.

Signed and Sealed this
Twenty-eighth Day of February, 2023

Katherine Kelly Vidal
*Director of the United States Patent and Trademark Office*